(12) United States Patent
Inouye et al.

(10) Patent No.: US 12,502,178 B2
(45) Date of Patent: Dec. 23, 2025

(54) MEDICAL DEVICE FOR OCCLUDING A LEFT ATRIAL APPENDAGE

(71) Applicant: BOSTON SCIENTIFIC SCIMED, INC., Maple Grove, MN (US)

(72) Inventors: Joshua Mark Inouye, Brooklyn Park, MN (US); Brian Joseph Tischler, Shoreview, MN (US); Neal Eidenschink, Wayzata, MN (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 211 days.

(21) Appl. No.: 18/234,023

(22) Filed: Aug. 15, 2023

(65) Prior Publication Data

US 2024/0058012 A1  Feb. 22, 2024

Related U.S. Application Data

(60) Provisional application No. 63/398,281, filed on Aug. 16, 2022.

(51) Int. Cl.
*A61B 17/12* (2006.01)
*A61B 17/00* (2006.01)

(52) U.S. Cl.
CPC .. *A61B 17/12122* (2013.01); *A61B 17/12168* (2013.01); *A61B 2017/00632* (2013.01); *A61B 2017/1205* (2013.01)

(58) Field of Classification Search
CPC ........ A61B 17/12122; A61B 17/12168; A61B 17/12172; A61B 17/12031; A61B 2017/00632; A61B 2017/1205
See application file for complete search history.

(56) References Cited

U.S. PATENT DOCUMENTS

| 178,283 A | 6/1876 | French |
| 1,967,318 A | 7/1934 | Monahan |

(Continued)

FOREIGN PATENT DOCUMENTS

| CN | 1399571 A | 2/2003 |
| CN | 202143640 U | 2/2012 |

(Continued)

OTHER PUBLICATIONS

International Search Report and Written Opinion dated Nov. 10, 2023 for International Application No. PCT/US2023/030224.

(Continued)

*Primary Examiner* — Katherine Shi
*Assistant Examiner* — Mohammed S Adam
(74) *Attorney, Agent, or Firm* — Seager, Tufte & Wickhem LLP

(57) ABSTRACT

A medical implant for occluding a left atrial appendage may include an expandable framework configured to shift radially between a first configuration and a second configuration, and an occlusive element secured to the expandable framework. The framework includes a plurality of strut groups, each strut group comprising first and second joints, and first, second, and third struts. The first and second struts move laterally from a first position in the first configuration to a second position in the second configuration. The third strut is configured to shift radially from a first position in the first configuration to a second position in the second configuration. The first and second struts and a majority of the third struts of each strut group may be oriented parallel to each other in the first configuration and nonparallel to each other in the second configuration.

11 Claims, 10 Drawing Sheets

(56) References Cited

U.S. PATENT DOCUMENTS

| | | |
|---|---|---|
| 3,402,710 A | 9/1968 | Paleschuck |
| 3,540,431 A | 11/1970 | Mobin-Uddin |
| 3,557,794 A | 1/1971 | Van Patten |
| 3,638,652 A | 2/1972 | Kelley |
| 3,671,979 A | 6/1972 | Moulopoulos |
| 3,811,449 A | 5/1974 | Gravlee et al. |
| 3,844,302 A | 10/1974 | Klein |
| 3,874,388 A | 4/1975 | King et al. |
| 4,007,743 A | 2/1977 | Blake |
| 4,108,420 A | 8/1978 | West et al. |
| 4,175,545 A | 11/1979 | Termanini |
| 4,249,946 A | 2/1981 | Danielson |
| 4,291,420 A | 9/1981 | Reul |
| 4,309,776 A | 1/1982 | Berguer |
| 4,341,218 A | 7/1982 | Ü |
| 4,364,392 A | 12/1982 | Strother et al. |
| 4,425,908 A | 1/1984 | Simon |
| 4,545,367 A | 10/1985 | Tucci |
| 4,585,000 A | 4/1986 | Hershenson |
| 4,603,693 A | 8/1986 | Conta et al. |
| 4,611,594 A | 9/1986 | Grayhack et al. |
| 4,619,246 A | 10/1986 | Molgaard-Nielsen et al. |
| 4,638,803 A | 1/1987 | Rand et al. |
| 4,665,906 A | 5/1987 | Jervis |
| 4,681,588 A | 7/1987 | Ketharanathan et al. |
| 4,710,192 A | 12/1987 | Liotta et al. |
| 4,718,417 A | 1/1988 | Kittrell et al. |
| 4,759,348 A | 7/1988 | Cawood et al. |
| 4,781,177 A | 11/1988 | Lebigot |
| 4,787,901 A | 11/1988 | Baykut |
| 4,793,348 A | 12/1988 | Palmaz |
| 4,827,907 A | 5/1989 | Tashiro |
| 4,832,055 A | 5/1989 | Palestrant |
| 4,852,568 A | 8/1989 | Kensey |
| 4,872,874 A | 10/1989 | Taheri |
| 4,873,978 A | 10/1989 | Ginsburg |
| 4,890,612 A | 1/1990 | Kensey |
| 4,917,089 A | 4/1990 | Sideris |
| 4,921,479 A | 5/1990 | Grayzel |
| 4,921,484 A | 5/1990 | Hillstead |
| 4,935,030 A | 6/1990 | Alonso |
| 4,960,412 A | 10/1990 | Fink |
| 4,966,150 A | 10/1990 | Etienne et al. |
| 4,994,077 A | 2/1991 | Dobben |
| 4,998,972 A | 3/1991 | Chin et al. |
| 5,002,567 A | 3/1991 | Bona et al. |
| 5,021,059 A | 6/1991 | Kensey et al. |
| 5,037,810 A | 8/1991 | Saliba, Jr. |
| 5,041,090 A | 8/1991 | Scheglov et al. |
| 5,041,093 A | 8/1991 | Chu |
| 5,042,707 A | 8/1991 | Taheri |
| 5,053,009 A | 10/1991 | Herzberg |
| 5,061,274 A | 10/1991 | Kensey |
| 5,064,435 A | 11/1991 | Porter |
| 5,071,407 A | 12/1991 | Termin et al. |
| 5,078,736 A | 1/1992 | Behl |
| 5,098,440 A | 3/1992 | Hillstead |
| 5,108,418 A | 4/1992 | Lefebvre |
| 5,108,420 A | 4/1992 | Marks |
| 5,108,474 A | 4/1992 | Riedy et al. |
| 5,116,360 A | 5/1992 | Pinchuk et al. |
| 5,122,136 A | 6/1992 | Guglielmi et al. |
| 5,141,491 A | 8/1992 | Bowald |
| 5,163,953 A | 11/1992 | Vince |
| 5,171,259 A | 12/1992 | Inoue |
| 5,171,383 A | 12/1992 | Sagaye et al. |
| 5,176,692 A | 1/1993 | Wilk et al. |
| 5,192,301 A | 3/1993 | Kamiya et al. |
| 5,211,658 A | 5/1993 | Clouse |
| 5,219,355 A | 6/1993 | Parodi et al. |
| 5,234,458 A | 8/1993 | Metais |
| 5,254,127 A | 10/1993 | Wholey et al. |
| 5,256,146 A | 10/1993 | Ensminger et al. |
| 5,258,000 A | 11/1993 | Gianturco |
| 5,258,042 A | 11/1993 | Mehta |
| 5,279,539 A | 1/1994 | Bohan et al. |
| 5,284,488 A | 2/1994 | Sideris |
| 5,304,184 A | 4/1994 | Hathaway et al. |
| 5,306,234 A | 4/1994 | Johnson |
| 5,312,341 A | 5/1994 | Turi |
| 5,327,774 A | 7/1994 | Nguyen et al. |
| 5,329,942 A | 7/1994 | Gunther et al. |
| 5,332,402 A | 7/1994 | Teitelbaum |
| 5,334,217 A | 8/1994 | Das |
| 5,344,439 A | 9/1994 | Otten |
| 5,350,398 A | 9/1994 | Pavcnik et al. |
| 5,350,399 A | 9/1994 | Erlebacher et al. |
| 5,353,784 A | 10/1994 | Nady-Mohamed |
| 5,366,460 A | 11/1994 | Eberbach |
| 5,366,504 A | 11/1994 | Andersen et al. |
| 5,370,657 A | 12/1994 | Irie |
| 5,370,685 A | 12/1994 | Stevens |
| 5,375,612 A | 12/1994 | Cottenceau et al. |
| 5,383,899 A | 1/1995 | Hammerslag |
| 5,397,331 A | 3/1995 | Himpens et al. |
| 5,397,355 A | 3/1995 | Marin et al. |
| 5,409,444 A | 4/1995 | Kensey et al. |
| 5,411,552 A | 5/1995 | Andersen et al. |
| 5,417,699 A | 5/1995 | Klein et al. |
| 5,421,832 A | 6/1995 | Lefebvre |
| 5,425,744 A | 6/1995 | Fagan et al. |
| 5,427,119 A | 6/1995 | Swartz et al. |
| 5,433,727 A | 7/1995 | Sideris |
| 5,443,454 A | 8/1995 | Tanabe et al. |
| 5,443,478 A | 8/1995 | Purdy et al. |
| 5,451,235 A | 9/1995 | Lock et al. |
| 5,454,365 A | 10/1995 | Bonutti |
| 5,464,408 A | 11/1995 | Duc |
| 5,469,867 A | 11/1995 | Schmitt |
| 5,469,868 A | 11/1995 | Reger |
| 5,480,423 A | 1/1996 | Ravenscroft et al. |
| 5,490,856 A | 2/1996 | Person et al. |
| 5,497,774 A | 3/1996 | Swartz et al. |
| 5,499,975 A | 3/1996 | Cope et al. |
| 5,499,995 A | 3/1996 | Teirstein |
| 5,500,014 A | 3/1996 | Quijano et al. |
| 5,522,790 A | 6/1996 | Moll et al. |
| 5,522,822 A | 6/1996 | Phelps et al. |
| 5,522,836 A | 6/1996 | Palermo |
| 5,527,322 A | 6/1996 | Klein et al. |
| 5,527,338 A | 6/1996 | Purdy |
| 5,545,214 A | 8/1996 | Stevens |
| 5,554,185 A | 9/1996 | Block et al. |
| 5,558,093 A | 9/1996 | Pomeranz et al. |
| 5,558,652 A | 9/1996 | Henke |
| 5,569,204 A | 10/1996 | Cramer et al. |
| 5,591,195 A | 1/1997 | Taheri et al. |
| 5,591,196 A | 1/1997 | Marin et al. |
| 5,614,204 A | 3/1997 | Cochrum |
| 5,634,936 A | 6/1997 | Linden et al. |
| 5,634,942 A | 6/1997 | Chevillon et al. |
| 5,637,097 A | 6/1997 | Yoon |
| 5,643,208 A | 7/1997 | Parodi |
| 5,643,282 A | 7/1997 | Kieturakis |
| 5,643,292 A | 7/1997 | Hart |
| 5,649,953 A | 7/1997 | Lefebvre |
| 5,653,690 A | 8/1997 | Booth et al. |
| 5,662,671 A | 9/1997 | Barbut et al. |
| 5,669,933 A | 9/1997 | Simon et al. |
| 5,681,345 A | 10/1997 | Euteneuer |
| 5,681,347 A | 10/1997 | Cathcart et al. |
| 5,683,411 A | 11/1997 | Kavteladze et al. |
| 5,690,671 A | 11/1997 | McGurk et al. |
| 5,693,067 A | 12/1997 | Purdy |
| 5,693,087 A | 12/1997 | Parodi |
| 5,695,525 A | 12/1997 | Mulhauser et al. |
| 5,700,285 A | 12/1997 | Myers et al. |
| 5,702,421 A | 12/1997 | Schneidt |
| 5,704,910 A | 1/1998 | Humes |
| 5,709,224 A | 1/1998 | Behl et al. |
| 5,709,704 A | 1/1998 | Nott et al. |
| 5,709,707 A | 1/1998 | Lock et al. |
| 5,713,953 A | 2/1998 | Vallana et al. |
| 5,716,370 A | 2/1998 | Williamson, IV et al. |

(56) References Cited

U.S. PATENT DOCUMENTS

| | | |
|---|---|---|
| 5,722,400 A | 3/1998 | Ockuly et al. |
| 5,724,975 A | 3/1998 | Negus et al. |
| 5,725,512 A | 3/1998 | Swartz et al. |
| 5,725,552 A | 3/1998 | Kotula et al. |
| 5,725,568 A | 3/1998 | Hastings |
| 5,733,294 A | 3/1998 | Forber et al. |
| 5,733,302 A | 3/1998 | Myler et al. |
| 5,735,290 A | 4/1998 | Sterman et al. |
| 5,735,859 A | 4/1998 | Fischell et al. |
| 5,741,326 A | 4/1998 | Solovay |
| 5,741,333 A | 4/1998 | Frid |
| 5,749,880 A | 5/1998 | Banas et al. |
| 5,749,883 A | 5/1998 | Halpern |
| 5,749,894 A | 5/1998 | Engelson |
| 5,766,219 A | 6/1998 | Horton |
| 5,766,246 A | 6/1998 | Mulhauser et al. |
| 5,769,816 A | 6/1998 | Barbut et al. |
| 5,769,870 A | 6/1998 | Salahieh et al. |
| 5,776,097 A | 7/1998 | Massoud |
| 5,776,162 A | 7/1998 | Kleshinski |
| 5,782,860 A | 7/1998 | Epstein et al. |
| 5,785,679 A | 7/1998 | Abolfathi et al. |
| 5,800,454 A | 9/1998 | Jacobsen et al. |
| 5,800,457 A | 9/1998 | Gelbfish |
| 5,800,506 A | 9/1998 | Perouse |
| 5,800,512 A | 9/1998 | Letnz et al. |
| 5,807,261 A | 9/1998 | Benaron et al. |
| 5,810,874 A | 9/1998 | Lefebvre |
| 5,814,028 A | 9/1998 | Swartz et al. |
| 5,814,029 A | 9/1998 | Hassett |
| 5,814,064 A | 9/1998 | Daniel |
| 5,820,591 A | 10/1998 | Thompson et al. |
| 5,823,198 A | 10/1998 | Jones et al. |
| 5,824,061 A | 10/1998 | Quijano et al. |
| 5,827,227 A | 10/1998 | Delago |
| 5,830,228 A | 11/1998 | Knapp et al. |
| 5,833,673 A | 11/1998 | Ockuly et al. |
| 5,836,913 A | 11/1998 | Orth et al. |
| 5,836,968 A | 11/1998 | Simon et al. |
| 5,840,027 A | 11/1998 | Swartz et al. |
| 5,843,118 A | 12/1998 | Sepetka et al. |
| 5,846,260 A | 12/1998 | Maahs |
| 5,846,261 A | 12/1998 | Kotula et al. |
| 5,848,969 A | 12/1998 | Panescu et al. |
| 5,849,005 A | 12/1998 | Garrison et al. |
| 5,851,232 A | 12/1998 | Lois |
| 5,853,422 A | 12/1998 | Huebsch et al. |
| 5,855,565 A | 1/1999 | Bar-Cohen et al. |
| 5,855,597 A | 1/1999 | Jayaraman |
| 5,855,600 A | 1/1999 | Alt |
| 5,865,791 A | 2/1999 | Whayne et al. |
| 5,865,802 A | 2/1999 | Yoon et al. |
| 5,868,702 A | 2/1999 | Stevens et al. |
| 5,868,708 A | 2/1999 | Hart et al. |
| 5,876,367 A | 3/1999 | Kaganov et al. |
| 5,879,296 A | 3/1999 | Ockuly et al. |
| 5,879,320 A | 3/1999 | Cazenave |
| 5,879,366 A | 3/1999 | Shaw et al. |
| 5,882,340 A | 3/1999 | Yoon |
| 5,885,258 A | 3/1999 | Sachdeva et al. |
| 5,891,558 A | 4/1999 | Bell et al. |
| 5,895,399 A | 4/1999 | Barbut et al. |
| 5,895,419 A | 4/1999 | Tweden et al. |
| 5,902,289 A | 5/1999 | Swartz et al. |
| 5,904,680 A | 5/1999 | Kordis et al. |
| 5,904,703 A | 5/1999 | Gilson |
| 5,906,207 A | 5/1999 | Shen |
| 5,910,154 A | 6/1999 | Tsugita et al. |
| 5,910,170 A | 6/1999 | Reimink et al. |
| 5,911,734 A | 6/1999 | Tsugita et al. |
| 5,916,236 A | 6/1999 | Muij Van de Moer et al. |
| 5,925,060 A | 7/1999 | Forber |
| 5,925,063 A | 7/1999 | Khosravi |
| 5,925,074 A | 7/1999 | Gingras et al. |
| 5,925,075 A | 7/1999 | Myers et al. |
| 5,928,192 A | 7/1999 | Maahs |
| 5,928,260 A | 7/1999 | Chin et al. |
| 5,931,818 A | 8/1999 | Werp et al. |
| 5,935,145 A | 8/1999 | Villar et al. |
| 5,935,147 A | 8/1999 | Kensey et al. |
| 5,935,148 A | 8/1999 | Villar et al. |
| 5,941,249 A | 8/1999 | Maynard |
| 5,941,896 A | 8/1999 | Kerr |
| 5,944,738 A | 8/1999 | Amplatz et al. |
| 5,947,997 A | 9/1999 | Pavcnik et al. |
| 5,951,589 A | 9/1999 | Epstein et al. |
| 5,951,599 A | 9/1999 | McCrory |
| 5,954,694 A | 9/1999 | Sunseri |
| 5,954,767 A | 9/1999 | Pajotin et al. |
| 5,957,940 A | 9/1999 | Tanner et al. |
| 5,961,545 A | 10/1999 | Lentz et al. |
| 5,976,174 A | 11/1999 | Ruiz |
| 5,980,514 A | 11/1999 | Kupiecki et al. |
| 5,980,555 A | 11/1999 | Barbut et al. |
| 5,989,281 A | 11/1999 | Barbut et al. |
| 5,993,469 A | 11/1999 | McKenzie et al. |
| 5,993,483 A | 11/1999 | Gianotti |
| 5,997,508 A | 12/1999 | Lunn et al. |
| 5,997,557 A | 12/1999 | Barbut et al. |
| 6,004,280 A | 12/1999 | Buck et al. |
| 6,004,348 A | 12/1999 | Banas et al. |
| 6,007,523 A | 12/1999 | Mangosong |
| 6,007,557 A | 12/1999 | Ambrisco et al. |
| 6,010,517 A | 1/2000 | Baccaro |
| 6,010,522 A | 1/2000 | Barbut et al. |
| 6,010,531 A | 1/2000 | Donlon et al. |
| 6,013,093 A | 1/2000 | Nott et al. |
| 6,024,751 A | 2/2000 | Lovato et al. |
| 6,024,754 A | 2/2000 | Engelson |
| 6,024,755 A | 2/2000 | Addis |
| 6,024,756 A | 2/2000 | Huebsch et al. |
| 6,027,520 A | 2/2000 | Tsugita et al. |
| 6,033,420 A | 3/2000 | Hahnen |
| 6,036,720 A | 3/2000 | Abrams et al. |
| 6,042,598 A | 3/2000 | Tsugita et al. |
| 6,042,607 A | 3/2000 | Williamson, IV et al. |
| 6,048,331 A | 4/2000 | Tsugita et al. |
| 6,051,014 A | 4/2000 | Jang |
| 6,051,015 A | 4/2000 | Maahs |
| 6,056,720 A | 5/2000 | Morse |
| 6,063,070 A | 5/2000 | Eder |
| 6,063,113 A | 5/2000 | Kavteladze et al. |
| 6,066,126 A | 5/2000 | Li et al. |
| 6,068,621 A | 5/2000 | Balceta et al. |
| 6,074,357 A | 6/2000 | Kaganov et al. |
| 6,076,012 A | 6/2000 | Swanson et al. |
| 6,079,414 A | 6/2000 | Roth |
| 6,080,182 A | 6/2000 | Shaw et al. |
| 6,080,183 A | 6/2000 | Tsugita et al. |
| 6,083,239 A | 7/2000 | Addis |
| 6,090,072 A | 7/2000 | Kratoska et al. |
| 6,090,084 A | 7/2000 | Hassett et al. |
| 6,096,052 A | 8/2000 | Callister et al. |
| 6,096,053 A | 8/2000 | Bates et al. |
| 6,110,243 A | 8/2000 | Wnenchak et al. |
| 6,120,524 A | 9/2000 | Taheri |
| 6,123,715 A | 9/2000 | Amplatz |
| 6,124,523 A | 9/2000 | Banas et al. |
| 6,132,438 A | 10/2000 | Fleischman et al. |
| 6,135,991 A | 10/2000 | Muni et al. |
| 6,136,016 A | 10/2000 | Barbut et al. |
| 6,139,527 A | 10/2000 | Laufer et al. |
| 6,139,573 A | 10/2000 | Sogard et al. |
| 6,139,575 A | 10/2000 | Shu et al. |
| 6,152,144 A | 11/2000 | Lesh et al. |
| 6,152,946 A | 11/2000 | Broome et al. |
| 6,156,055 A | 12/2000 | Ravenscroft |
| 6,159,195 A | 12/2000 | Ha et al. |
| 6,161,543 A | 12/2000 | Cox et al. |
| 6,168,615 B1 | 1/2001 | Ken et al. |
| 6,171,329 B1 | 1/2001 | Shaw et al. |
| 6,179,859 B1 | 1/2001 | Bates et al. |
| 6,183,443 B1 | 2/2001 | Kratoska et al. |
| 6,193,739 B1 | 2/2001 | Chevillon et al. |

(56) References Cited

U.S. PATENT DOCUMENTS

| | | | |
|---|---|---|---|
| 6,203,531 B1 | 3/2001 | Ockuly et al. |
| 6,206,907 B1 | 3/2001 | Marino et al. |
| 6,214,029 B1 | 4/2001 | Thill et al. |
| 6,221,092 B1 | 4/2001 | Koike et al. |
| 6,231,561 B1 | 5/2001 | Frazier et al. |
| 6,231,589 B1 | 5/2001 | Wessman et al. |
| 6,235,045 B1 | 5/2001 | Barbut et al. |
| 6,245,012 B1 | 6/2001 | Kleshinski |
| 6,251,122 B1 | 6/2001 | Tsukernik |
| 6,258,115 B1 | 7/2001 | Dubrul |
| 6,264,671 B1 | 7/2001 | Stack et al. |
| 6,267,772 B1 | 7/2001 | Mulhauser et al. |
| 6,267,776 B1 | 7/2001 | O'Connell |
| 6,270,490 B1 | 8/2001 | Hahnen |
| 6,270,530 B1 | 8/2001 | Eldridge et al. |
| 6,270,902 B1 | 8/2001 | Tedeschi et al. |
| 6,277,138 B1 | 8/2001 | Levinson et al. |
| 6,285,898 B1 | 9/2001 | Ben-Haim |
| 6,287,334 B1 | 9/2001 | Moll et al. |
| 6,290,674 B1 | 9/2001 | Roue et al. |
| 6,290,708 B1 | 9/2001 | Kugel et al. |
| 6,312,407 B1 | 11/2001 | Zadno-Azizi et al. |
| 6,312,447 B1 | 11/2001 | Grimes |
| 6,319,251 B1 | 11/2001 | Tu et al. |
| 6,328,727 B1 | 12/2001 | Frazier et al. |
| 6,328,755 B1 | 12/2001 | Marshall |
| 6,336,937 B1 | 1/2002 | Vonesh et al. |
| 6,342,062 B1 | 1/2002 | Suon et al. |
| 6,346,116 B1 | 2/2002 | Brooks et al. |
| 6,346,895 B1 | 2/2002 | Lee et al. |
| 6,355,030 B1 | 3/2002 | Aldrich et al. |
| 6,361,545 B1 | 3/2002 | Macoviak et al. |
| 6,364,895 B1 | 4/2002 | Greenhalgh |
| 6,368,338 B1 | 4/2002 | Kónya et al. |
| 6,371,971 B1 | 4/2002 | Tsugita et al. |
| 6,375,670 B1 | 4/2002 | Greenhalgh |
| 6,391,044 B1 | 5/2002 | Yadav et al. |
| 6,395,014 B1 | 5/2002 | Macoviak et al. |
| 6,398,803 B1 | 6/2002 | Layne et al. |
| 6,402,746 B1 | 6/2002 | Whayne et al. |
| 6,402,771 B1 | 6/2002 | Palmer et al. |
| 6,402,779 B1 | 6/2002 | Colone et al. |
| 6,402,780 B2 | 6/2002 | Williamson et al. |
| 6,419,669 B1 | 7/2002 | Frazier et al. |
| 6,419,696 B1 | 7/2002 | Ortiz et al. |
| 6,425,916 B1 | 7/2002 | Garrison et al. |
| 6,431,271 B1 | 8/2002 | Thomeer et al. |
| 6,433,979 B1 | 8/2002 | Yu |
| 6,440,152 B1 | 8/2002 | Gainor et al. |
| 6,440,164 B1 | 8/2002 | Dimatteo et al. |
| 6,443,972 B1 | 9/2002 | Bosma et al. |
| 6,447,530 B1 | 9/2002 | Ostrovsky et al. |
| 6,451,054 B1 | 9/2002 | Stevens |
| 6,454,775 B1 | 9/2002 | Demarais et al. |
| 6,454,799 B1 | 9/2002 | Schreck |
| 6,458,145 B1 | 10/2002 | Ravenscroft et al. |
| 6,461,366 B1 | 10/2002 | Seguin |
| 6,464,712 B1 | 10/2002 | Epstein et al. |
| 6,468,291 B2 | 10/2002 | Bates et al. |
| 6,468,301 B1 | 10/2002 | Amplatz et al. |
| 6,485,501 B1 | 11/2002 | Green |
| 6,488,689 B1 | 12/2002 | Kaplan et al. |
| 6,488,702 B1 | 12/2002 | Besselink |
| 6,503,272 B2 | 1/2003 | Duerig et al. |
| 6,508,833 B2 | 1/2003 | Pavcnik et al. |
| 6,511,496 B1 | 1/2003 | Huter et al. |
| 6,514,280 B1 | 2/2003 | Gilson |
| 6,517,573 B1 | 2/2003 | Pollock et al. |
| 6,533,782 B2 | 3/2003 | Howell et al. |
| 6,547,760 B1 | 4/2003 | Samson et al. |
| 6,547,815 B2 | 4/2003 | Myers |
| 6,551,303 B1 | 4/2003 | Van Tassel et al. |
| 6,551,344 B2 | 4/2003 | Thill |
| 6,558,401 B1 | 5/2003 | Azizi |
| 6,558,405 B1 | 5/2003 | McInnes |
| 6,558,414 B2 | 5/2003 | Layne |
| 6,562,058 B2 | 5/2003 | Seguin et al. |
| 6,564,805 B2 | 5/2003 | Garrison et al. |
| 6,569,184 B2 | 5/2003 | Huter |
| 6,569,196 B1 | 5/2003 | Vesely |
| 6,569,214 B2 | 5/2003 | Williams et al. |
| 6,585,758 B1 | 7/2003 | Chouinard et al. |
| 6,589,214 B2 | 7/2003 | McGuckin et al. |
| 6,589,251 B2 | 7/2003 | Yee et al. |
| 6,599,308 B2 | 7/2003 | Amplatz |
| 6,602,271 B2 | 8/2003 | Adams et al. |
| 6,602,286 B1 | 8/2003 | Strecker |
| 6,623,508 B2 | 9/2003 | Shaw et al. |
| 6,629,534 B1 | 10/2003 | St. Goar et al. |
| 6,635,085 B1 | 10/2003 | Caffey et al. |
| 6,641,564 B1 | 11/2003 | Kraus |
| 6,650,923 B1 | 11/2003 | Lesh et al. |
| 6,652,555 B1 | 11/2003 | VanTassel et al. |
| 6,652,556 B1 | 11/2003 | VanTassel et al. |
| 6,666,861 B1 | 12/2003 | Grabek |
| 6,666,885 B2 | 12/2003 | Moe |
| 6,666,886 B1 | 12/2003 | Tranquillo et al. |
| 6,669,680 B1 | 12/2003 | Macoviak et al. |
| 6,669,725 B2 | 12/2003 | Scott |
| 6,673,109 B2 | 1/2004 | Cox |
| 6,676,698 B2 | 1/2004 | McGuckin et al. |
| 6,676,702 B2 | 1/2004 | Mathis |
| 6,682,558 B2 | 1/2004 | Tu et al. |
| 6,682,559 B2 | 1/2004 | Myers et al. |
| 6,685,739 B2 | 2/2004 | Dimatteo et al. |
| 6,689,150 B1 | 2/2004 | Vantassel et al. |
| 6,692,512 B2 | 2/2004 | Jang |
| 6,695,864 B2 | 2/2004 | Macoviak et al. |
| 6,695,866 B1 | 2/2004 | Kuehn et al. |
| 6,695,878 B2 | 2/2004 | McGuckin et al. |
| 6,699,260 B2 | 3/2004 | Dubrul et al. |
| 6,699,276 B2 | 3/2004 | Sogard et al. |
| 6,702,825 B2 | 3/2004 | Frazier et al. |
| 6,709,456 B2 | 3/2004 | Langberg et al. |
| 6,709,457 B1 | 3/2004 | Otte et al. |
| 6,712,836 B1 | 3/2004 | Berg et al. |
| 6,716,241 B2 | 4/2004 | Wilder et al. |
| 6,716,244 B2 | 4/2004 | Klaco |
| 6,719,767 B1 | 4/2004 | Kimblad |
| 6,719,784 B2 | 4/2004 | Henderson |
| 6,719,786 B2 | 4/2004 | Ryan et al. |
| 6,719,787 B2 | 4/2004 | Cox |
| 6,719,788 B2 | 4/2004 | Cox |
| 6,719,789 B2 | 4/2004 | Cox |
| 6,719,790 B2 | 4/2004 | Brendzel et al. |
| 6,723,038 B1 | 4/2004 | Schroeder et al. |
| 6,723,122 B2 | 4/2004 | Yang et al. |
| 6,723,123 B1 | 4/2004 | Kazatchkov et al. |
| 6,726,701 B2 | 4/2004 | Gilson et al. |
| 6,726,715 B2 | 4/2004 | Sutherland |
| 6,726,716 B2 | 4/2004 | Marquez |
| 6,726,717 B2 | 4/2004 | Alfieri et al. |
| 6,730,108 B2 | 5/2004 | Van Tassel et al. |
| 6,730,118 B2 | 5/2004 | Spenser et al. |
| 6,730,121 B2 | 5/2004 | Ortiz et al. |
| 6,730,122 B1 | 5/2004 | Pan et al. |
| 6,736,845 B2 | 5/2004 | Marquez et al. |
| 6,736,846 B2 | 5/2004 | Cox |
| 6,749,630 B2 | 6/2004 | Mccarthy et al. |
| 6,752,813 B2 | 6/2004 | Goldfarb et al. |
| 6,752,828 B2 | 6/2004 | Thornton |
| 6,755,812 B2 | 6/2004 | Peterson et al. |
| 6,755,857 B2 | 6/2004 | Peterson et al. |
| 6,761,734 B2 | 7/2004 | Suhr |
| 6,761,735 B2 | 7/2004 | Eberhardt et al. |
| 6,764,494 B2 | 7/2004 | Menz et al. |
| 6,764,508 B2 | 7/2004 | Roehe et al. |
| 6,764,509 B2 | 7/2004 | Chinn et al. |
| 6,764,510 B2 | 7/2004 | Vidlund et al. |
| 6,767,362 B2 | 7/2004 | Schreck |
| 6,769,434 B2 | 8/2004 | Liddicoat et al. |
| 6,770,083 B2 | 8/2004 | Seguin |
| 6,780,200 B2 | 8/2004 | Jansen |
| 6,786,924 B2 | 9/2004 | Ryan et al. |

(56) References Cited

U.S. PATENT DOCUMENTS

| | | |
|---|---|---|
| 6,786,925 B1 | 9/2004 | Schoon et al. |
| 6,790,229 B1 | 9/2004 | Berreklouw |
| 6,790,230 B2 | 9/2004 | Beyersdorf et al. |
| 6,790,231 B2 | 9/2004 | Liddicoat et al. |
| 6,793,673 B2 | 9/2004 | Kowalsky et al. |
| 6,794,474 B2 | 9/2004 | Richard et al. |
| 6,797,000 B2 | 9/2004 | Simpson et al. |
| 6,797,001 B2 | 9/2004 | Mathis et al. |
| 6,797,002 B2 | 9/2004 | Spence et al. |
| 6,802,860 B2 | 10/2004 | Cosgrove et al. |
| 6,805,710 B2 | 10/2004 | Bolling et al. |
| 6,805,711 B2 | 10/2004 | Quijano et al. |
| 6,810,882 B2 | 11/2004 | Langberg et al. |
| 6,821,297 B2 | 11/2004 | Snyders |
| 6,824,562 B2 | 11/2004 | Mathis et al. |
| 6,827,737 B2 | 12/2004 | Hill et al. |
| 6,830,584 B1 | 12/2004 | Seguin |
| 6,830,585 B1 | 12/2004 | Artof et al. |
| 6,837,901 B2 | 1/2005 | Rabkin et al. |
| 6,837,902 B2 | 1/2005 | Nguyen et al. |
| 6,840,246 B2 | 1/2005 | Downing |
| 6,840,957 B2 | 1/2005 | Dimatteo et al. |
| 6,846,324 B2 | 1/2005 | Stobie |
| 6,846,325 B2 | 1/2005 | Liddicoat |
| 6,855,153 B2 | 2/2005 | Saadat |
| 6,858,039 B2 | 2/2005 | Mccarthy |
| 6,869,444 B2 | 3/2005 | Gabbay |
| 6,872,226 B2 | 3/2005 | Cali et al. |
| 6,875,224 B2 | 4/2005 | Grimes |
| 6,875,230 B1 | 4/2005 | Morita et al. |
| 6,875,231 B2 | 4/2005 | Anduiza et al. |
| 6,881,199 B2 | 4/2005 | Wilk et al. |
| 6,881,224 B2 | 4/2005 | Kruse et al. |
| 6,883,522 B2 | 4/2005 | Spence et al. |
| 6,890,352 B1 | 5/2005 | Lentell |
| 6,890,353 B2 | 5/2005 | Cohn et al. |
| 6,893,459 B1 | 5/2005 | Macoviak |
| 6,893,460 B2 | 5/2005 | Spenser et al. |
| 6,896,700 B2 | 5/2005 | Lu et al. |
| 6,902,576 B2 | 6/2005 | Drasler et al. |
| 6,908,478 B2 | 6/2005 | Alferness et al. |
| 6,908,481 B2 | 6/2005 | Cribier |
| 6,911,037 B2 | 6/2005 | Gainor et al. |
| 6,911,043 B2 | 6/2005 | Myers et al. |
| 6,913,608 B2 | 7/2005 | Liddicoat et al. |
| 6,916,338 B2 | 7/2005 | Speziali |
| 6,918,917 B1 | 7/2005 | Nguyen et al. |
| 6,921,407 B2 | 7/2005 | Nguyen et al. |
| 6,921,811 B2 | 7/2005 | Zamora et al. |
| 6,926,715 B1 | 8/2005 | Hauck et al. |
| 6,926,730 B1 | 8/2005 | Nguyen et al. |
| 6,929,653 B2 | 8/2005 | Strecter |
| 6,932,838 B2 | 8/2005 | Schwartz et al. |
| 6,936,067 B2 | 8/2005 | Buchanan |
| 6,939,359 B2 | 9/2005 | Tu et al. |
| 6,942,653 B2 | 9/2005 | Quinn |
| 6,942,694 B2 | 9/2005 | Liddicoat et al. |
| 6,945,957 B2 | 9/2005 | Freyman |
| 6,945,978 B1 | 9/2005 | Hyde |
| 6,945,996 B2 | 9/2005 | Sedransk |
| 6,945,997 B2 | 9/2005 | Huynh et al. |
| 6,949,113 B2 | 9/2005 | Van Tassel et al. |
| 6,949,122 B2 | 9/2005 | Adams et al. |
| 6,951,571 B1 | 10/2005 | Srivastava |
| 6,951,573 B1 | 10/2005 | Dilling |
| 6,955,689 B2 | 10/2005 | Ryan et al. |
| 6,958,061 B2 | 10/2005 | Truckai et al. |
| 6,958,076 B2 | 10/2005 | Acosta et al. |
| 6,962,605 B2 | 11/2005 | Cosgrove et al. |
| 6,964,682 B2 | 11/2005 | Nguyen-Thien-Nhon et al. |
| 6,964,683 B2 | 11/2005 | Kowalsky et al. |
| 6,964,684 B2 | 11/2005 | Ortiz et al. |
| 6,966,925 B2 | 11/2005 | Stobie |
| 6,966,926 B2 | 11/2005 | Mathis |
| 6,969,395 B2 | 11/2005 | Eskuri |
| 6,974,464 B2 | 12/2005 | Quijano et al. |
| 6,974,476 B2 | 12/2005 | McGuckin, Jr. et al. |
| 6,976,995 B2 | 12/2005 | Mathis et al. |
| 6,979,350 B2 | 12/2005 | Moll et al. |
| 6,986,775 B2 | 1/2006 | Morales et al. |
| 6,989,027 B2 | 1/2006 | Allen et al. |
| 6,989,028 B2 | 1/2006 | Lashinski et al. |
| 6,994,092 B2 | 2/2006 | van der Burg et al. |
| 6,997,939 B2 | 2/2006 | Linder et al. |
| 6,997,948 B2 | 2/2006 | Stinson |
| 6,997,950 B2 | 2/2006 | Chawla |
| 6,997,951 B2 | 2/2006 | Solem et al. |
| 7,004,176 B2 | 2/2006 | Lau |
| 7,007,396 B2 | 3/2006 | Rudko et al. |
| 7,011,669 B2 | 3/2006 | Kimblad |
| 7,011,671 B2 | 3/2006 | Welch |
| 7,011,681 B2 | 3/2006 | Vesely |
| 7,011,682 B2 | 3/2006 | Lashinski et al. |
| 7,014,645 B2 | 3/2006 | Greene, Jr. et al. |
| 7,018,406 B2 | 3/2006 | Seguin et al. |
| 7,018,407 B1 | 3/2006 | Wright et al. |
| 7,018,408 B2 | 3/2006 | Bailey et al. |
| 7,022,134 B1 | 4/2006 | Quijano et al. |
| 7,025,780 B2 | 4/2006 | Gabbay |
| 7,029,494 B2 | 4/2006 | Soun et al. |
| 7,033,390 B2 | 4/2006 | Johnson et al. |
| 7,037,321 B2 | 5/2006 | Sachdeva et al. |
| 7,037,333 B2 | 5/2006 | Myers et al. |
| 7,037,334 B1 | 5/2006 | Hlavka et al. |
| 7,041,128 B2 | 5/2006 | Mcguckin, Jr. et al. |
| 7,041,132 B2 | 5/2006 | Quijano et al. |
| 7,044,134 B2 | 5/2006 | Khairkhahan et al. |
| 7,044,966 B2 | 5/2006 | Svanidze et al. |
| 7,044,967 B1 | 5/2006 | Solem et al. |
| 7,048,754 B2 | 5/2006 | Martin et al. |
| 7,048,757 B2 | 5/2006 | Shaknovich |
| 7,052,487 B2 | 5/2006 | Cohn et al. |
| 7,052,507 B2 | 5/2006 | Wakuda et al. |
| 7,063,722 B2 | 6/2006 | Marquez |
| 7,066,954 B2 | 6/2006 | Ryan et al. |
| 7,070,616 B2 | 7/2006 | Majercak et al. |
| 7,077,862 B2 | 7/2006 | Vidlund et al. |
| 7,081,131 B2 | 7/2006 | Thornton |
| 7,083,633 B2 | 8/2006 | Morrill et al. |
| 7,087,064 B1 | 8/2006 | Hyde |
| 7,089,051 B2 | 8/2006 | Jverud et al. |
| 7,090,695 B2 | 8/2006 | Solem et al. |
| 7,097,651 B2 | 8/2006 | Harrison et al. |
| 7,128,073 B1 | 10/2006 | van der Burg et al. |
| 7,137,991 B2 | 11/2006 | Fedie |
| 7,152,605 B2 | 12/2006 | Khairkhahan et al. |
| 7,169,164 B2 | 1/2007 | Borillo et al. |
| 7,179,275 B2 | 2/2007 | McGuckin, Jr. et al. |
| 7,226,466 B2 | 6/2007 | Opolski |
| 7,235,097 B2 | 6/2007 | Calisse et al. |
| 7,303,526 B2 | 12/2007 | Sharkey et al. |
| 7,323,002 B2 | 1/2008 | Johnson et al. |
| 7,585,309 B2 | 9/2009 | Larson |
| 7,591,832 B2 | 9/2009 | Eversull et al. |
| 7,597,704 B2 | 10/2009 | Frazier et al. |
| 7,604,650 B2 | 10/2009 | Bergheim |
| 7,678,123 B2 | 3/2010 | Chanduszko |
| 7,695,425 B2 | 4/2010 | Schweich et al. |
| 7,713,282 B2 | 5/2010 | Frazier et al. |
| 7,722,641 B2 | 5/2010 | van der Burg et al. |
| 7,727,189 B2 | 6/2010 | VanTassel et al. |
| 7,735,493 B2 | 6/2010 | van der Burg et al. |
| 7,762,995 B2 | 7/2010 | Eversull et al. |
| 7,780,694 B2 | 8/2010 | Palmer et al. |
| 7,799,049 B2 | 9/2010 | Ostrovsky et al. |
| 7,811,300 B2 | 10/2010 | Feller, III et al. |
| 7,811,314 B2 | 10/2010 | Fierens et al. |
| 7,834,527 B2 | 11/2010 | Alvarez Icaza Rivera et al. |
| 7,862,500 B2 | 1/2011 | Khairkhahan et al. |
| 7,875,051 B2 | 1/2011 | Beulke et al. |
| 7,927,365 B2 | 4/2011 | Fierens et al. |
| 7,972,359 B2 | 7/2011 | Kreidler |
| 8,025,495 B2 | 9/2011 | Hardert et al. |
| 8,043,329 B2 | 10/2011 | Khairkhahan et al. |

(56) References Cited

U.S. PATENT DOCUMENTS

| | | |
|---|---|---|
| 8,052,715 B2 | 11/2011 | Quinn et al. |
| 8,062,282 B2 | 11/2011 | Kolb |
| 8,080,032 B2 | 12/2011 | van der Burg et al. |
| 8,097,015 B2 | 1/2012 | Devellian |
| 8,114,114 B2 | 2/2012 | Belson |
| 8,206,412 B2 | 6/2012 | Galdonik et al. |
| 8,221,384 B2 | 7/2012 | Frazier et al. |
| 8,221,445 B2 | 7/2012 | van Tassel et al. |
| 8,252,016 B2 | 8/2012 | Anwar |
| 8,287,563 B2 | 10/2012 | Khairkhahan et al. |
| 8,287,564 B2 | 10/2012 | Beulke et al. |
| 8,308,754 B2 | 11/2012 | Belson |
| 8,323,309 B2 | 12/2012 | Khairkhahan et al. |
| 8,388,672 B2 | 3/2013 | Khairkhahan et al. |
| 8,491,623 B2 | 7/2013 | Vogel et al. |
| 8,523,897 B2 | 9/2013 | van der Burg et al. |
| 8,535,343 B2 | 9/2013 | van der Burg et al. |
| 8,562,509 B2 | 10/2013 | Bates |
| 8,663,273 B2 | 3/2014 | Khairkhahan et al. |
| 8,685,055 B2 | 4/2014 | VanTassel et al. |
| 8,764,793 B2 | 7/2014 | Lee |
| 8,834,519 B2 | 9/2014 | van der Burg et al. |
| 8,845,711 B2 | 9/2014 | Miles et al. |
| 9,034,006 B2 | 5/2015 | Quinn et al. |
| 9,132,000 B2 | 9/2015 | VanTassel et al. |
| 9,168,043 B2 | 10/2015 | van der Burg et al. |
| 9,211,124 B2 | 12/2015 | Campbell et al. |
| 9,241,782 B2 | 1/2016 | Besselink |
| 9,445,895 B2 | 9/2016 | Kreidler |
| 9,554,806 B2 | 1/2017 | Larsen et al. |
| 9,561,037 B2 | 2/2017 | Fogarty et al. |
| 9,561,097 B1 | 2/2017 | Kim et al. |
| 9,629,636 B2 | 4/2017 | Fogarty et al. |
| 9,730,701 B2 | 8/2017 | Tischler et al. |
| 9,763,666 B2 | 9/2017 | Wu et al. |
| 9,883,936 B2 | 2/2018 | Sutton et al. |
| 9,913,652 B2 | 3/2018 | Bridgeman et al. |
| 9,943,299 B2 | 4/2018 | Khairkhahan et al. |
| 9,943,315 B2 | 4/2018 | Kaplan et al. |
| 9,949,825 B2 | 4/2018 | Braido et al. |
| 10,071,181 B1 | 9/2018 | Penegor et al. |
| 10,076,335 B2 | 9/2018 | Zaver et al. |
| 10,143,458 B2 | 12/2018 | Kreidler |
| 10,376,254 B2 | 8/2019 | Eichenschink et al. |
| 11,318,017 B2 | 5/2022 | Besselink |
| 2001/0000797 A1 | 5/2001 | Mazzocchi |
| 2001/0020181 A1 | 9/2001 | Layne |
| 2001/0034537 A1 | 10/2001 | Shaw et al. |
| 2001/0037141 A1 | 11/2001 | Yee et al. |
| 2002/0013571 A1 | 1/2002 | Goldfarb et al. |
| 2002/0022860 A1 | 2/2002 | Borillo et al. |
| 2002/0026216 A1 | 2/2002 | Grimes |
| 2002/0035374 A1 | 3/2002 | Borillo et al. |
| 2002/0045931 A1 | 4/2002 | Sogard et al. |
| 2002/0062133 A1 | 5/2002 | Gilson et al. |
| 2002/0082630 A1 | 6/2002 | Menz et al. |
| 2002/0082638 A1 | 6/2002 | Porter et al. |
| 2002/0082675 A1 | 6/2002 | Myers |
| 2002/0099439 A1 | 7/2002 | Schwartz et al. |
| 2002/0111647 A1 | 8/2002 | Khairkhahan et al. |
| 2002/0123802 A1 | 9/2002 | Snyders |
| 2002/0138094 A1 | 9/2002 | Borillo et al. |
| 2002/0138097 A1 | 9/2002 | Ostrovsky et al. |
| 2002/0142119 A1 | 10/2002 | Seward et al. |
| 2002/0151970 A1 | 10/2002 | Garrison et al. |
| 2002/0165601 A1 | 11/2002 | Clerc |
| 2002/0165606 A1 | 11/2002 | Wolf et al. |
| 2002/0169475 A1 | 11/2002 | Gainor et al. |
| 2002/0177855 A1 | 11/2002 | Greene, Jr. et al. |
| 2002/0183835 A1 | 12/2002 | Taylor et al. |
| 2002/0183838 A1 | 12/2002 | Liddicoat et al. |
| 2002/0198594 A1 | 12/2002 | Schreck |
| 2003/0017775 A1 | 1/2003 | Dong et al. |
| 2003/0023262 A1 | 1/2003 | Welch |
| 2003/0023266 A1 | 1/2003 | Borillo et al. |
| 2003/0040792 A1 | 2/2003 | Gabbay |
| 2003/0050694 A1 | 3/2003 | Yang et al. |
| 2003/0057156 A1 | 3/2003 | Peterson et al. |
| 2003/0060871 A1 | 3/2003 | Hill et al. |
| 2003/0120337 A1 | 6/2003 | Van Tassel et al. |
| 2003/0130720 A1 | 7/2003 | DePalma et al. |
| 2003/0130729 A1 | 7/2003 | Paniagua et al. |
| 2003/0158571 A1 | 8/2003 | Esch et al. |
| 2003/0158574 A1 | 8/2003 | Esch et al. |
| 2003/0163194 A1 | 8/2003 | Quijano et al. |
| 2003/0167071 A1 | 9/2003 | Martin et al. |
| 2003/0171806 A1 | 9/2003 | Mathis et al. |
| 2003/0181942 A1 | 9/2003 | Sutton et al. |
| 2003/0191526 A1 | 10/2003 | Van Tassel et al. |
| 2003/0195555 A1 | 10/2003 | Khairkhahan et al. |
| 2003/0199975 A1 | 10/2003 | Gabbay |
| 2003/0204203 A1 | 10/2003 | Khairkhahan et al. |
| 2003/0208214 A1 | 11/2003 | Loshakove et al. |
| 2003/0220667 A1 | 11/2003 | van der Burg et al. |
| 2003/0229394 A1 | 12/2003 | Ogle et al. |
| 2003/0229395 A1 | 12/2003 | Cox |
| 2003/0233115 A1 | 12/2003 | Eversull et al. |
| 2003/0233142 A1 | 12/2003 | Morales et al. |
| 2003/0236568 A1 | 12/2003 | Hojeibane et al. |
| 2003/0236569 A1 | 12/2003 | Mathis et al. |
| 2004/0002719 A1 | 1/2004 | Oz et al. |
| 2004/0003819 A1 | 1/2004 | St. Goar |
| 2004/0010305 A1 | 1/2004 | Alferness et al. |
| 2004/0015230 A1 | 1/2004 | Moll et al. |
| 2004/0015232 A1 | 1/2004 | Shu et al. |
| 2004/0015233 A1 | 1/2004 | Jansen |
| 2004/0019374 A1 | 1/2004 | Hojeibane et al. |
| 2004/0019377 A1 | 1/2004 | Taylor et al. |
| 2004/0019378 A1 | 1/2004 | Hlavka et al. |
| 2004/0024447 A1 | 2/2004 | Haverich |
| 2004/0024451 A1 | 2/2004 | Johnson et al. |
| 2004/0024452 A1 | 2/2004 | Kruse et al. |
| 2004/0030321 A1 | 2/2004 | Frangrow, Jr. |
| 2004/0030381 A1 | 2/2004 | Shu |
| 2004/0030382 A1 | 2/2004 | St. Goar et al. |
| 2004/0030405 A1 | 2/2004 | Carpentier et al. |
| 2004/0034366 A1 | 2/2004 | van der Burg et al. |
| 2004/0034380 A1 | 2/2004 | Woolfson et al. |
| 2004/0034411 A1 | 2/2004 | Quijano et al. |
| 2004/0039436 A1 | 2/2004 | Spenser et al. |
| 2004/0039442 A1 | 2/2004 | St. Goar et al. |
| 2004/0039443 A1 | 2/2004 | Solem et al. |
| 2004/0044350 A1 | 3/2004 | Martin et al. |
| 2004/0044365 A1 | 3/2004 | Bachman |
| 2004/0044403 A1 | 3/2004 | Bischoff et al. |
| 2004/0049207 A1 | 3/2004 | Goldfarb et al. |
| 2004/0049210 A1 | 3/2004 | VanTassel et al. |
| 2004/0049211 A1 | 3/2004 | Tremulis et al. |
| 2004/0049226 A1 | 3/2004 | Anduiza et al. |
| 2004/0059351 A1 | 3/2004 | Eigler et al. |
| 2004/0059411 A1 | 3/2004 | Strecker |
| 2004/0059412 A1 | 3/2004 | Lytle, IV et al. |
| 2004/0060161 A1 | 4/2004 | Leal et al. |
| 2004/0073301 A1 | 4/2004 | Donlon et al. |
| 2004/0073302 A1 | 4/2004 | Rourke et al. |
| 2004/0078072 A1 | 4/2004 | Tu et al. |
| 2004/0078074 A1 | 4/2004 | Anderson et al. |
| 2004/0082910 A1 | 4/2004 | Constantz et al. |
| 2004/0082923 A1 | 4/2004 | Field |
| 2004/0082991 A1 | 4/2004 | Nguyen et al. |
| 2004/0087975 A1 | 5/2004 | Lucatero et al. |
| 2004/0088045 A1 | 5/2004 | Cox |
| 2004/0088046 A1 | 5/2004 | Speziali |
| 2004/0092858 A1 | 5/2004 | Wilson et al. |
| 2004/0093012 A1 | 5/2004 | Cully et al. |
| 2004/0093060 A1 | 5/2004 | Seguin et al. |
| 2004/0093070 A1 | 5/2004 | Hojeibane et al. |
| 2004/0093080 A1 | 5/2004 | Helmus et al. |
| 2004/0097979 A1 | 5/2004 | Svandize et al. |
| 2004/0098031 A1 | 5/2004 | van der Burg et al. |
| 2004/0098098 A1 | 5/2004 | McGuckin, Jr. et al. |
| 2004/0098112 A1 | 5/2004 | DiMatteo et al. |
| 2004/0102839 A1 | 5/2004 | Cohn et al. |
| 2004/0102840 A1 | 5/2004 | Solem et al. |

(56) References Cited

U.S. PATENT DOCUMENTS

| | | |
|---|---|---|
| 2004/0102842 A1 | 5/2004 | Jansen |
| 2004/0106976 A1 | 6/2004 | Bailey et al. |
| 2004/0106990 A1 | 6/2004 | Spence et al. |
| 2004/0106991 A1 | 6/2004 | Hopkins et al. |
| 2004/0111096 A1 | 6/2004 | Tu et al. |
| 2004/0117004 A1 | 6/2004 | Osborne et al. |
| 2004/0117009 A1 | 6/2004 | Cali et al. |
| 2004/0122448 A1 | 6/2004 | Levine |
| 2004/0122467 A1 | 6/2004 | VanTassel et al. |
| 2004/0122512 A1 | 6/2004 | Navia et al. |
| 2004/0122513 A1 | 6/2004 | Navia et al. |
| 2004/0122514 A1 | 6/2004 | Fogarty et al. |
| 2004/0122515 A1 | 6/2004 | Chu |
| 2004/0122516 A1 | 6/2004 | Fogarty et al. |
| 2004/0127935 A1 | 7/2004 | VanTassel et al. |
| 2004/0127979 A1 | 7/2004 | Wilson et al. |
| 2004/0127980 A1 | 7/2004 | Kowalsky et al. |
| 2004/0127981 A1 | 7/2004 | Rahdert et al. |
| 2004/0127982 A1 | 7/2004 | Machold et al. |
| 2004/0133220 A1 | 7/2004 | Lashinski et al. |
| 2004/0133267 A1 | 7/2004 | Lane |
| 2004/0133273 A1 | 7/2004 | Cox |
| 2004/0138742 A1 | 7/2004 | Myers et al. |
| 2004/0138743 A1 | 7/2004 | Myers et al. |
| 2004/0138744 A1 | 7/2004 | Lashinski et al. |
| 2004/0138745 A1 | 7/2004 | Macoviak et al. |
| 2004/0148018 A1 | 7/2004 | Carpentier et al. |
| 2004/0148019 A1 | 7/2004 | Vidlund et al. |
| 2004/0148020 A1 | 7/2004 | Vidlund et al. |
| 2004/0153052 A1 | 8/2004 | Mathis |
| 2004/0153146 A1 | 8/2004 | Lashinski et al. |
| 2004/0153147 A1 | 8/2004 | Mathis |
| 2004/0158274 A1 | 8/2004 | WasDyke |
| 2004/0158321 A1 | 8/2004 | Reuter et al. |
| 2004/0162610 A1 | 8/2004 | Liska et al. |
| 2004/0167539 A1 | 8/2004 | Kuehn et al. |
| 2004/0167620 A1 | 8/2004 | Ortiz et al. |
| 2004/0172046 A1 | 9/2004 | Hlavka et al. |
| 2004/0176839 A1 | 9/2004 | Huynh et al. |
| 2004/0176840 A1 | 9/2004 | Langberg et al. |
| 2004/0181238 A1 | 9/2004 | Zarbatany et al. |
| 2004/0186444 A1 | 9/2004 | Daly et al. |
| 2004/0186486 A1 | 9/2004 | Roue et al. |
| 2004/0186558 A1 | 9/2004 | Pavcnik et al. |
| 2004/0186561 A1 | 9/2004 | McGuckin, Jr. et al. |
| 2004/0186563 A1 | 9/2004 | Lobbi |
| 2004/0186565 A1 | 9/2004 | Shreck |
| 2004/0186566 A1 | 9/2004 | Hindrichs et al. |
| 2004/0193191 A1 | 9/2004 | Starksen et al. |
| 2004/0193253 A1 | 9/2004 | Thorpe et al. |
| 2004/0193260 A1 | 9/2004 | Alferness et al. |
| 2004/0199155 A1 | 10/2004 | Mollenauer |
| 2004/0199183 A1 | 10/2004 | Oz et al. |
| 2004/0199191 A1 | 10/2004 | Schwartz |
| 2004/0204758 A1 | 10/2004 | Eberhardt et al. |
| 2004/0206363 A1 | 10/2004 | McCarthy et al. |
| 2004/0210240 A1 | 10/2004 | Saint |
| 2004/0210301 A1 | 10/2004 | Obermiller |
| 2004/0210303 A1 | 10/2004 | Sedransk |
| 2004/0210304 A1 | 10/2004 | Seguin et al. |
| 2004/0210305 A1 | 10/2004 | Shu et al. |
| 2004/0210306 A1 | 10/2004 | Quijano et al. |
| 2004/0210307 A1 | 10/2004 | Khairkhahan |
| 2004/0215230 A1 | 10/2004 | Frazier et al. |
| 2004/0215333 A1 | 10/2004 | Duran et al. |
| 2004/0215339 A1 | 10/2004 | Drasler et al. |
| 2004/0220610 A1 | 11/2004 | Kreidler et al. |
| 2004/0220654 A1 | 11/2004 | Mathis et al. |
| 2004/0220657 A1 | 11/2004 | Nieminen et al. |
| 2004/0220682 A1 | 11/2004 | Levine et al. |
| 2004/0225322 A1 | 11/2004 | Garrison et al. |
| 2004/0225344 A1 | 11/2004 | Hoffa et al. |
| 2004/0225348 A1 | 11/2004 | Case et al. |
| 2004/0225352 A1 | 11/2004 | Osborne et al. |
| 2004/0225353 A1 | 11/2004 | McGuckin, Jr. et al. |
| 2004/0225354 A1 | 11/2004 | Allen et al. |
| 2004/0225355 A1 | 11/2004 | Stevens |
| 2004/0225356 A1 | 11/2004 | Frater |
| 2004/0230117 A1 | 11/2004 | Tosaya et al. |
| 2004/0230222 A1 | 11/2004 | van der Burg et al. |
| 2004/0230297 A1 | 11/2004 | Thornton |
| 2004/0236411 A1 | 11/2004 | Sarac et al. |
| 2004/0236418 A1 | 11/2004 | Stevens |
| 2004/0236419 A1 | 11/2004 | Milo |
| 2004/0243153 A1 | 12/2004 | Liddicoat et al. |
| 2004/0243219 A1 | 12/2004 | Fischer et al. |
| 2004/0243227 A1 | 12/2004 | Starksen et al. |
| 2004/0243228 A1 | 12/2004 | Kowalsky et al. |
| 2004/0243230 A1 | 12/2004 | Navia et al. |
| 2004/0254600 A1 | 12/2004 | Zarbatany et al. |
| 2004/0254636 A1 | 12/2004 | Flagle et al. |
| 2004/0260276 A1 | 12/2004 | Rudko et al. |
| 2004/0260317 A1 | 12/2004 | Bloom et al. |
| 2004/0260322 A1 | 12/2004 | Rudko et al. |
| 2004/0260389 A1 | 12/2004 | Case et al. |
| 2004/0260390 A1 | 12/2004 | Sarac et al. |
| 2004/0260393 A1 | 12/2004 | Rahdert et al. |
| 2004/0260394 A1 | 12/2004 | Douk et al. |
| 2004/0267357 A1 | 12/2004 | Allen et al. |
| 2005/0004583 A1 | 1/2005 | Oz et al. |
| 2005/0004652 A1 | 1/2005 | van der Burg et al. |
| 2005/0004667 A1 | 1/2005 | Swinford et al. |
| 2005/0010285 A1 | 1/2005 | Lambrecht et al. |
| 2005/0010287 A1 | 1/2005 | Macoviak et al. |
| 2005/0015109 A1 | 1/2005 | Lichtenstein |
| 2005/0015112 A1 | 1/2005 | Cohn et al. |
| 2005/0021056 A1 | 1/2005 | St. Goar et al. |
| 2005/0021136 A1 | 1/2005 | Xie et al. |
| 2005/0027261 A1 | 2/2005 | Weaver et al. |
| 2005/0027348 A1 | 2/2005 | Case et al. |
| 2005/0027351 A1 | 2/2005 | Reuter et al. |
| 2005/0027353 A1 | 2/2005 | Alferness et al. |
| 2005/0033398 A1 | 2/2005 | Seguin |
| 2005/0033419 A1 | 2/2005 | Alferness et al. |
| 2005/0033446 A1 | 2/2005 | Deem et al. |
| 2005/0037050 A1 | 2/2005 | Weber |
| 2005/0038468 A1 | 2/2005 | Panetta et al. |
| 2005/0038470 A1 | 2/2005 | van der Burg et al. |
| 2005/0038506 A1 | 2/2005 | Webler et al. |
| 2005/0038507 A1 | 2/2005 | Alferness et al. |
| 2005/0043790 A1 | 2/2005 | Seguin |
| 2005/0043792 A1 | 2/2005 | Solem et al. |
| 2005/0049573 A1 | 3/2005 | Van Tassel et al. |
| 2005/0049679 A1 | 3/2005 | Taylor et al. |
| 2005/0049692 A1 | 3/2005 | Numamoto et al. |
| 2005/0049696 A1 | 3/2005 | Siess et al. |
| 2005/0049697 A1 | 3/2005 | Sievers |
| 2005/0054977 A1 | 3/2005 | Laird et al. |
| 2005/0055079 A1 | 3/2005 | Duran |
| 2005/0055087 A1 | 3/2005 | Starksen |
| 2005/0055088 A1 | 3/2005 | Liddicoat et al. |
| 2005/0055089 A1 | 3/2005 | Macoviak et al. |
| 2005/0060029 A1 | 3/2005 | Le et al. |
| 2005/0060030 A1 | 3/2005 | Lashinski et al. |
| 2005/0065460 A1 | 3/2005 | Laird |
| 2005/0065550 A1 | 3/2005 | Starksen et al. |
| 2005/0065594 A1 | 3/2005 | DiMatteo et al. |
| 2005/0065597 A1 | 3/2005 | Lansac |
| 2005/0070952 A1 | 3/2005 | Devellian |
| 2005/0070998 A1 | 3/2005 | Rourke et al. |
| 2005/0075584 A1 | 4/2005 | Cali |
| 2005/0075659 A1 | 4/2005 | Realyvasquez et al. |
| 2005/0075662 A1 | 4/2005 | Pedersen et al. |
| 2005/0075712 A1 | 4/2005 | Bianucci et al. |
| 2005/0075713 A1 | 4/2005 | Bianucci et al. |
| 2005/0075717 A1 | 4/2005 | Nguyen et al. |
| 2005/0075718 A1 | 4/2005 | Nguyen et al. |
| 2005/0075719 A1 | 4/2005 | Bergheim |
| 2005/0075720 A1 | 4/2005 | Nguyen et al. |
| 2005/0075723 A1 | 4/2005 | Schroeder et al. |
| 2005/0075724 A1 | 4/2005 | Svanidze et al. |
| 2005/0075725 A1 | 4/2005 | Rowe |
| 2005/0075726 A1 | 4/2005 | Svanidze et al. |
| 2005/0075729 A1 | 4/2005 | Nguyen et al. |

(56) References Cited

U.S. PATENT DOCUMENTS

| | | |
|---|---|---|
| 2005/0075730 A1 | 4/2005 | Myers et al. |
| 2005/0075731 A1 | 4/2005 | Artof et al. |
| 2005/0080483 A1 | 4/2005 | Solem et al. |
| 2005/0085841 A1 | 4/2005 | Eversull et al. |
| 2005/0085842 A1 | 4/2005 | Eversull et al. |
| 2005/0085900 A1 | 4/2005 | Case et al. |
| 2005/0085903 A1 | 4/2005 | Lau |
| 2005/0085904 A1 | 4/2005 | Lemmon |
| 2005/0090846 A1 | 4/2005 | Pedersen et al. |
| 2005/0096735 A1 | 5/2005 | Hojeibane et al. |
| 2005/0096738 A1 | 5/2005 | Cali et al. |
| 2005/0096739 A1 | 5/2005 | Cao |
| 2005/0096740 A1 | 5/2005 | Langberg et al. |
| 2005/0101975 A1 | 5/2005 | Nguyen et al. |
| 2005/0102026 A1 | 5/2005 | Turner et al. |
| 2005/0107810 A1 | 5/2005 | Morales et al. |
| 2005/0107811 A1 | 5/2005 | Starksen et al. |
| 2005/0107812 A1 | 5/2005 | Starksen et al. |
| 2005/0107867 A1 | 5/2005 | Taheri |
| 2005/0107872 A1 | 5/2005 | Mensah et al. |
| 2005/0113861 A1 | 5/2005 | Corcoran et al. |
| 2005/0113910 A1 | 5/2005 | Paniagua et al. |
| 2005/0119673 A1 | 6/2005 | Gordon et al. |
| 2005/0119734 A1 | 6/2005 | Spence et al. |
| 2005/0119735 A1 | 6/2005 | Spence et al. |
| 2005/0125011 A1 | 6/2005 | Spence et al. |
| 2005/0125020 A1 | 6/2005 | Meade et al. |
| 2005/0131438 A1 | 6/2005 | Cohn |
| 2005/0137449 A1 | 6/2005 | Nieminen et al. |
| 2005/0137450 A1 | 6/2005 | Aronson et al. |
| 2005/0137451 A1 | 6/2005 | Gordon et al. |
| 2005/0137676 A1 | 6/2005 | Richardson et al. |
| 2005/0137681 A1 | 6/2005 | Shoemaker et al. |
| 2005/0137682 A1 | 6/2005 | Justino |
| 2005/0137685 A1 | 6/2005 | Nieminen et al. |
| 2005/0137686 A1 | 6/2005 | Salahieh et al. |
| 2005/0137688 A1 | 6/2005 | Salahieh et al. |
| 2005/0137689 A1 | 6/2005 | Salahieh et al. |
| 2005/0137690 A1 | 6/2005 | Salahieh et al. |
| 2005/0137691 A1 | 6/2005 | Salahieh et al. |
| 2005/0137692 A1 | 6/2005 | Haug et al. |
| 2005/0137693 A1 | 6/2005 | Haug et al. |
| 2005/0137694 A1 | 6/2005 | Haug et al. |
| 2005/0137696 A1 | 6/2005 | Salahieh et al. |
| 2005/0137697 A1 | 6/2005 | Salahieh et al. |
| 2005/0137698 A1 | 6/2005 | Salahieh et al. |
| 2005/0137699 A1 | 6/2005 | Salahieh et al. |
| 2005/0137700 A1 | 6/2005 | Spence et al. |
| 2005/0137701 A1 | 6/2005 | Salahieh et al. |
| 2005/0137702 A1 | 6/2005 | Haug et al. |
| 2005/0143807 A1 | 6/2005 | Pavcnik et al. |
| 2005/0143809 A1 | 6/2005 | Salahieh et al. |
| 2005/0143810 A1 | 6/2005 | Dauner et al. |
| 2005/0143811 A1 | 6/2005 | Realyvasquez |
| 2005/0149014 A1 | 7/2005 | Hauck et al. |
| 2005/0149176 A1 | 7/2005 | Heggestuen et al. |
| 2005/0149179 A1 | 7/2005 | Mathis et al. |
| 2005/0149180 A1 | 7/2005 | Mathis et al. |
| 2005/0149181 A1 | 7/2005 | Eberhardt |
| 2005/0159810 A1 | 7/2005 | Filsoufi |
| 2005/0159811 A1 | 7/2005 | Lane |
| 2005/0165477 A1 | 7/2005 | Anduiza et al. |
| 2005/0165478 A1 | 7/2005 | Song |
| 2005/0171472 A1 | 8/2005 | Lutter |
| 2005/0171601 A1 | 8/2005 | Cosgrove et al. |
| 2005/0177182 A1 | 8/2005 | van der Burg et al. |
| 2005/0177227 A1 | 8/2005 | Heim et al. |
| 2005/0177228 A1 | 8/2005 | Solem et al. |
| 2005/0182483 A1 | 8/2005 | Osborne et al. |
| 2005/0184122 A1 | 8/2005 | Hlavka et al. |
| 2005/0187614 A1 | 8/2005 | Agnew |
| 2005/0187616 A1 | 8/2005 | Realyvasquez |
| 2005/0187617 A1 | 8/2005 | Navia |
| 2005/0192606 A1 | 9/2005 | Paul, Jr. et al. |
| 2005/0192665 A1 | 9/2005 | Spenser et al. |
| 2005/0197692 A1 | 9/2005 | Pai et al. |
| 2005/0197693 A1 | 9/2005 | Pai et al. |
| 2005/0197694 A1 | 9/2005 | Pai et al. |
| 2005/0203549 A1 | 9/2005 | Realyvasquez |
| 2005/0203568 A1 | 9/2005 | Burg et al. |
| 2005/0203605 A1 | 9/2005 | Dolan |
| 2005/0203607 A1 | 9/2005 | Scherrible |
| 2005/0203614 A1 | 9/2005 | Forster et al. |
| 2005/0203615 A1 | 9/2005 | Forster et al. |
| 2005/0203616 A1 | 9/2005 | Cribier |
| 2005/0203617 A1 | 9/2005 | Forster et al. |
| 2005/0203618 A1 | 9/2005 | Sharkawy et al. |
| 2005/0216039 A1 | 9/2005 | Lederman |
| 2005/0216077 A1 | 9/2005 | Mathis et al. |
| 2005/0216078 A1 | 9/2005 | Starksen et al. |
| 2005/0222675 A1 | 10/2005 | Sauter |
| 2005/0222678 A1 | 10/2005 | Lashinski et al. |
| 2005/0228422 A1 | 10/2005 | Machold et al. |
| 2005/0228479 A1 | 10/2005 | Pavcnik et al. |
| 2005/0228486 A1 | 10/2005 | Case et al. |
| 2005/0228494 A1 | 10/2005 | Marquez |
| 2005/0228495 A1 | 10/2005 | Macoviak |
| 2005/0228496 A1 | 10/2005 | Mensah et al. |
| 2005/0234541 A1 | 10/2005 | Hunt et al. |
| 2005/0234546 A1 | 10/2005 | Nugent et al. |
| 2005/0240200 A1 | 10/2005 | Bergheim |
| 2005/0240202 A1 | 10/2005 | Shennib et al. |
| 2005/0240255 A1 | 10/2005 | Schaeffer |
| 2005/0240259 A1 | 10/2005 | Sisken et al. |
| 2005/0240262 A1 | 10/2005 | White |
| 2005/0244460 A1 | 11/2005 | Alferiev et al. |
| 2005/0246013 A1 | 11/2005 | Gabbay |
| 2005/0251251 A1 | 11/2005 | Cribier |
| 2005/0256566 A1 | 11/2005 | Gabbay |
| 2005/0261704 A1 | 11/2005 | Mathis |
| 2005/0261759 A1 | 11/2005 | Lambrecht et al. |
| 2005/0267493 A1 | 12/2005 | Schreck et al. |
| 2005/0267516 A1 | 12/2005 | Soleimani et al. |
| 2005/0267560 A1 | 12/2005 | Bates |
| 2005/0267565 A1 | 12/2005 | Dave et al. |
| 2005/0267570 A1 | 12/2005 | Shadduck |
| 2005/0267571 A1 | 12/2005 | Spence et al. |
| 2005/0267574 A1 | 12/2005 | Cohn et al. |
| 2005/0272969 A1 | 12/2005 | Alferness et al. |
| 2005/0273160 A1 | 12/2005 | Lashinski et al. |
| 2005/0278015 A1 | 12/2005 | Dave et al. |
| 2005/0283178 A1 | 12/2005 | Flagle et al. |
| 2005/0283186 A1 | 12/2005 | Berrada et al. |
| 2005/0288704 A1 | 12/2005 | Cartier et al. |
| 2005/0288779 A1 | 12/2005 | Shaoulian et al. |
| 2006/0000715 A1 | 1/2006 | Whitcher et al. |
| 2006/0004439 A1 | 1/2006 | Spenser et al. |
| 2006/0004442 A1 | 1/2006 | Spenser et al. |
| 2006/0009835 A1 | 1/2006 | Osborne et al. |
| 2006/0009841 A1 | 1/2006 | McGuckin, Jr. et al. |
| 2006/0009842 A1 | 1/2006 | Huynh et al. |
| 2006/0013805 A1 | 1/2006 | Hebbel et al. |
| 2006/0013855 A1 | 1/2006 | Carpenter et al. |
| 2006/0015136 A1 | 1/2006 | Besselink |
| 2006/0015178 A1 | 1/2006 | Moaddeb et al. |
| 2006/0015179 A1 | 1/2006 | Bulman-Fleming et al. |
| 2006/0020275 A1 | 1/2006 | Goldfarb et al. |
| 2006/0020327 A1 | 1/2006 | Lashinski et al. |
| 2006/0020332 A1 | 1/2006 | Lashinski et al. |
| 2006/0020334 A1 | 1/2006 | Lashinski et al. |
| 2006/0020335 A1 | 1/2006 | Kowalsky et al. |
| 2006/0020336 A1 | 1/2006 | Liddicoat |
| 2006/0025750 A1 | 2/2006 | Starksen et al. |
| 2006/0025784 A1 | 2/2006 | Starksen et al. |
| 2006/0025787 A1 | 2/2006 | Morales et al. |
| 2006/0025854 A1 | 2/2006 | Lashinski et al. |
| 2006/0025855 A1 | 2/2006 | Lashinski et al. |
| 2006/0025856 A1 | 2/2006 | Ryan et al. |
| 2006/0025857 A1 | 2/2006 | Bergheim et al. |
| 2006/0030747 A1 | 2/2006 | Kantrowitz et al. |
| 2006/0030866 A1 | 2/2006 | Schreck |
| 2006/0030877 A1 | 2/2006 | Martinez et al. |
| 2006/0030882 A1 | 2/2006 | Adams et al. |
| 2006/0030885 A1 | 2/2006 | Hyde |

(56) References Cited

U.S. PATENT DOCUMENTS

| | | |
|---|---|---|
| 2006/0036317 A1 | 2/2006 | Vidlund et al. |
| 2006/0041305 A1 | 2/2006 | Lauterjung |
| 2006/0041306 A1 | 2/2006 | Vidlund et al. |
| 2006/0047297 A1 | 3/2006 | Case |
| 2006/0047338 A1 | 3/2006 | Jenson et al. |
| 2006/0047343 A1 | 3/2006 | Oviatt et al. |
| 2006/0052804 A1 | 3/2006 | Mialhe |
| 2006/0052816 A1 | 3/2006 | Bates et al. |
| 2006/0052867 A1 | 3/2006 | Revuelta et al. |
| 2006/0058817 A1 | 3/2006 | Starksen et al. |
| 2006/0058865 A1 | 3/2006 | Case et al. |
| 2006/0058871 A1 | 3/2006 | Zakay et al. |
| 2006/0058889 A1 | 3/2006 | Case et al. |
| 2006/0064115 A1 | 3/2006 | Allen et al. |
| 2006/0064116 A1 | 3/2006 | Allen et al. |
| 2006/0064118 A1 | 3/2006 | Kimblad |
| 2006/0064174 A1 | 3/2006 | Zadno |
| 2006/0069400 A1 | 3/2006 | Burnett et al. |
| 2006/0069424 A1 | 3/2006 | Acosta et al. |
| 2006/0069430 A9 | 3/2006 | Rahdert et al. |
| 2006/0074483 A1 | 4/2006 | Schrayer |
| 2006/0074484 A1 | 4/2006 | Huber |
| 2006/0074485 A1 | 4/2006 | Realyvasquez |
| 2006/0085060 A1 | 4/2006 | Campbell |
| 2006/0089708 A1 | 4/2006 | Osse et al. |
| 2006/0095115 A1 | 5/2006 | Bladillah et al. |
| 2006/0095125 A1 | 5/2006 | Chinn et al. |
| 2006/0099326 A1 | 5/2006 | Keogh et al. |
| 2006/0100658 A1 | 5/2006 | Obana et al. |
| 2006/0100697 A1 | 5/2006 | Casanova |
| 2006/0100699 A1 | 5/2006 | Vidlund et al. |
| 2006/0106278 A1 | 5/2006 | Machold et al. |
| 2006/0106279 A1 | 5/2006 | Machold et al. |
| 2006/0106456 A9 | 5/2006 | Machold et al. |
| 2006/0111660 A1 | 5/2006 | Wolf et al. |
| 2006/0111773 A1 | 5/2006 | Rittgers et al. |
| 2006/0111774 A1 | 5/2006 | Samkov et al. |
| 2006/0116572 A1 | 6/2006 | Case |
| 2006/0116756 A1 | 6/2006 | Solem et al. |
| 2006/0122686 A1 | 6/2006 | Gilad et al. |
| 2006/0122692 A1 | 6/2006 | Gilad et al. |
| 2006/0122693 A1 | 6/2006 | Biadillah et al. |
| 2006/0127443 A1 | 6/2006 | Helmus |
| 2006/0129235 A1 | 6/2006 | Seguin et al. |
| 2006/0129236 A1 | 6/2006 | McCarthy |
| 2006/0135476 A1 | 6/2006 | Kutryk et al. |
| 2006/0135964 A1 | 6/2006 | Vesely |
| 2006/0135967 A1 | 6/2006 | Realyvasquez |
| 2006/0136044 A1 | 6/2006 | Osborne et al. |
| 2006/0136045 A1 | 6/2006 | Flagle et al. |
| 2006/0136052 A1 | 6/2006 | Vesely |
| 2006/0136054 A1 | 6/2006 | Berg et al. |
| 2006/0142846 A1 | 6/2006 | Pavcnik et al. |
| 2006/0142847 A1 | 6/2006 | Shaknovich |
| 2006/0142848 A1 | 6/2006 | Gabbay |
| 2006/0142854 A1 | 6/2006 | Alferness et al. |
| 2006/0149358 A1 | 7/2006 | Zilla et al. |
| 2006/0149360 A1 | 7/2006 | Schwammenthal et al. |
| 2006/0149367 A1 | 7/2006 | Sieracki |
| 2006/0149368 A1 | 7/2006 | Spence |
| 2006/0155323 A1 | 7/2006 | Porter et al. |
| 2006/0161133 A1 | 7/2006 | Laird et al. |
| 2006/0161248 A1 | 7/2006 | Case et al. |
| 2006/0161250 A1 | 7/2006 | Shaw |
| 2006/0167468 A1 | 7/2006 | Gabbay |
| 2006/0167541 A1 | 7/2006 | Lattouf |
| 2006/0167542 A1 | 7/2006 | Quintessenza |
| 2006/0167543 A1 | 7/2006 | Bailey et al. |
| 2006/0235509 A1 | 10/2006 | Lafontaine |
| 2006/0253148 A1 | 11/2006 | Leone et al. |
| 2006/0253186 A1 | 11/2006 | Bates |
| 2007/0027534 A1 | 2/2007 | Bergheim et al. |
| 2007/0066993 A1 | 3/2007 | Kreidler |
| 2007/0078492 A1 | 4/2007 | Tozzi et al. |
| 2007/0083227 A1 | 4/2007 | van der Burg et al. |
| 2007/0083230 A1 | 4/2007 | Javois |
| 2007/0112383 A1 | 5/2007 | Conlon et al. |
| 2007/0150041 A1 | 6/2007 | Evans et al. |
| 2007/0156123 A1 | 7/2007 | Moll et al. |
| 2007/0162048 A1 | 7/2007 | Quinn et al. |
| 2007/0167980 A1 | 7/2007 | Figulla et al. |
| 2007/0185471 A1 | 8/2007 | Johnson |
| 2007/0208408 A1 | 9/2007 | Weber et al. |
| 2007/0276470 A1 | 11/2007 | Tenne |
| 2008/0065145 A1 | 3/2008 | Carpenter |
| 2008/0215008 A1 | 9/2008 | Nance et al. |
| 2008/0243081 A1 | 10/2008 | Nance et al. |
| 2008/0262596 A1 | 10/2008 | Xiao |
| 2008/0269866 A1 | 10/2008 | Hamer et al. |
| 2008/0275536 A1 | 11/2008 | Zarins et al. |
| 2008/0319526 A1 | 12/2008 | Hill et al. |
| 2009/0005803 A1 | 1/2009 | Batiste |
| 2009/0054965 A1 | 2/2009 | Richard |
| 2009/0062841 A1 | 3/2009 | Amplatz et al. |
| 2009/0082800 A1 | 3/2009 | Janardhan |
| 2009/0099647 A1 | 4/2009 | Glimsdale et al. |
| 2009/0105747 A1 | 4/2009 | Chanduszko et al. |
| 2009/0112249 A1 | 4/2009 | Miles et al. |
| 2009/0171386 A1 | 7/2009 | Amplatz et al. |
| 2009/0182278 A1 | 7/2009 | Eversull et al. |
| 2009/0254195 A1 | 10/2009 | Khairkhan et al. |
| 2009/0287182 A1 | 11/2009 | Bishop et al. |
| 2009/0287183 A1 | 11/2009 | Bishop et al. |
| 2009/0318948 A1 | 12/2009 | Linder et al. |
| 2010/0004726 A1 | 1/2010 | Hancock et al. |
| 2010/0016953 A1 | 1/2010 | Sisken et al. |
| 2010/0049238 A1 | 2/2010 | Simpson |
| 2010/0076482 A1 | 3/2010 | Shu et al. |
| 2010/0094209 A1 | 4/2010 | Drasler et al. |
| 2010/0094392 A1 | 4/2010 | Nguyen et al. |
| 2010/0106178 A1 | 4/2010 | Obermiller et al. |
| 2010/0168785 A1 | 7/2010 | Parker |
| 2010/0168836 A1 | 7/2010 | Kassab |
| 2010/0179583 A1 | 7/2010 | Carpenter et al. |
| 2010/0179584 A1 | 7/2010 | Carpenter et al. |
| 2010/0179585 A1 | 7/2010 | Carpenter et al. |
| 2010/0179647 A1 | 7/2010 | Carpenter et al. |
| 2010/0185231 A1 | 7/2010 | Lashinski |
| 2010/0191276 A1 | 7/2010 | Lashinski |
| 2010/0211095 A1 | 8/2010 | Carpenter |
| 2010/0217175 A1 | 8/2010 | Pah |
| 2010/0312268 A1 | 12/2010 | Belson |
| 2010/0324585 A1 | 12/2010 | Miles et al. |
| 2010/0324589 A1 | 12/2010 | Carpenter et al. |
| 2011/0054515 A1 | 3/2011 | Bridgeman et al. |
| 2011/0082495 A1 | 4/2011 | Ruiz |
| 2011/0098525 A1 | 4/2011 | Kermode et al. |
| 2011/0144690 A1 | 6/2011 | Bishop et al. |
| 2011/0152763 A1 | 6/2011 | Bishop et al. |
| 2011/0218566 A1 | 9/2011 | van der Burg et al. |
| 2011/0251679 A1 | 10/2011 | Wiemeyer et al. |
| 2011/0282379 A1 | 11/2011 | Lee et al. |
| 2011/0295304 A1 | 12/2011 | Jönsson |
| 2011/0301630 A1 | 12/2011 | Hendriksen et al. |
| 2012/0029553 A1 | 2/2012 | Quinn et al. |
| 2012/0035643 A1 | 2/2012 | Khairkhahan et al. |
| 2012/0035646 A1 | 2/2012 | McCrystle |
| 2012/0065662 A1 | 3/2012 | van der Burg et al. |
| 2012/0078343 A1 | 3/2012 | Fish |
| 2012/0083877 A1 | 4/2012 | Nguyen et al. |
| 2012/0109182 A1 | 5/2012 | Belson |
| 2012/0125619 A1 | 5/2012 | Wood et al. |
| 2012/0172654 A1 | 7/2012 | Bates |
| 2012/0172915 A1 | 7/2012 | Fifer et al. |
| 2012/0172916 A1 | 7/2012 | Fifer et al. |
| 2012/0172917 A1 | 7/2012 | Fifer et al. |
| 2012/0172918 A1 | 7/2012 | Fifer et al. |
| 2012/0172919 A1 | 7/2012 | Fifer et al. |
| 2012/0172920 A1 | 7/2012 | Fifer et al. |
| 2012/0172927 A1 | 7/2012 | Campbell et al. |
| 2012/0179033 A1 | 7/2012 | Merhi |
| 2012/0239077 A1 | 9/2012 | Zaver et al. |
| 2012/0239083 A1 | 9/2012 | Kreidler |
| 2012/0245619 A1 | 9/2012 | Guest |

(56) References Cited

U.S. PATENT DOCUMENTS

| | | |
|---|---|---|
| 2012/0283585 A1 | 11/2012 | Werneth et al. |
| 2012/0283773 A1 | 11/2012 | Van Tassel et al. |
| 2012/0289996 A1 | 11/2012 | Lee et al. |
| 2012/0323267 A1 | 12/2012 | Ren |
| 2013/0006343 A1 | 1/2013 | Kassab et al. |
| 2013/0012982 A1 | 1/2013 | Khairkhahan et al. |
| 2013/0018413 A1 | 1/2013 | Oral et al. |
| 2013/0110154 A1 | 5/2013 | van der Burg et al. |
| 2013/0131717 A1 | 5/2013 | Glimsdale |
| 2013/0144328 A1 | 6/2013 | Weber et al. |
| 2013/0165735 A1 | 6/2013 | Khairkhahan et al. |
| 2013/0211492 A1 | 8/2013 | Schneider et al. |
| 2013/0331884 A1 | 12/2013 | Van der Burg et al. |
| 2014/0005714 A1 | 1/2014 | Quick et al. |
| 2014/0018841 A1 | 1/2014 | Peiffer et al. |
| 2014/0039536 A1 | 2/2014 | Cully et al. |
| 2014/0046360 A1 | 2/2014 | van der Burg et al. |
| 2014/0081314 A1 | 3/2014 | Zaver et al. |
| 2014/0100596 A1 | 4/2014 | Rudman et al. |
| 2014/0142612 A1 | 5/2014 | Li et al. |
| 2014/0148842 A1 | 5/2014 | Khairkhahan et al. |
| 2014/0163605 A1 | 6/2014 | VanTassel et al. |
| 2014/0188157 A1 | 7/2014 | Clark |
| 2014/0303719 A1 | 10/2014 | Cox et al. |
| 2014/0336612 A1 | 11/2014 | Frydlewski et al. |
| 2014/0336699 A1 | 11/2014 | van der Burg et al. |
| 2014/0379068 A1 | 12/2014 | Thielen et al. |
| 2015/0005810 A1 | 1/2015 | Center et al. |
| 2015/0039021 A1 | 2/2015 | Khairkhahan et al. |
| 2015/0080903 A1 | 3/2015 | Dillard et al. |
| 2015/0173898 A1 | 6/2015 | Drasler et al. |
| 2015/0196300 A1 | 7/2015 | Tischler et al. |
| 2015/0230909 A1 | 8/2015 | Zaver et al. |
| 2015/0238197 A1 | 8/2015 | Quinn et al. |
| 2015/0305727 A1 | 10/2015 | Karimov et al. |
| 2015/0313604 A1 | 11/2015 | Roue et al. |
| 2015/0313605 A1 | 11/2015 | Griffin |
| 2015/0327979 A1 | 11/2015 | Quinn et al. |
| 2015/0342718 A1 | 12/2015 | Weber et al. |
| 2015/0374491 A1 | 12/2015 | Kreidler |
| 2016/0051358 A1 | 2/2016 | Sutton et al. |
| 2016/0058539 A1 | 3/2016 | VanTassel et al. |
| 2016/0066922 A1 | 3/2016 | Bridgeman et al. |
| 2016/0106437 A1 | 4/2016 | van der Burg et al. |
| 2016/0192942 A1 | 7/2016 | Strauss et al. |
| 2016/0287259 A1 | 10/2016 | Hanson et al. |
| 2016/0331382 A1 | 11/2016 | Center et al. |
| 2016/0374657 A1 | 12/2016 | Kreidler |
| 2017/0027552 A1 | 2/2017 | Turkington et al. |
| 2017/0042550 A1 | 2/2017 | Chakraborty et al. |
| 2017/0056166 A1 | 3/2017 | Ratz et al. |
| 2017/0100112 A1 | 4/2017 | van der Burg et al. |
| 2017/0181751 A1 | 6/2017 | Larsen et al. |
| 2017/0340336 A1 | 11/2017 | Osypka |
| 2018/0064446 A1 | 3/2018 | Figulla et al. |
| 2018/0070950 A1 | 3/2018 | Zaver et al. |
| 2018/0140412 A1 | 5/2018 | Sutton et al. |
| 2018/0140413 A1 | 5/2018 | Quinn et al. |
| 2018/0250014 A1 | 9/2018 | Melanson et al. |
| 2019/0125362 A1 | 5/2019 | Tischler et al. |
| 2019/0223883 A1 | 7/2019 | Anderson et al. |
| 2020/0060848 A1 | 2/2020 | Denison et al. |
| 2020/0289125 A1* | 9/2020 | Dholakia ......... A61B 17/12172 |
| 2022/0031333 A1 | 2/2022 | Zhou et al. |

FOREIGN PATENT DOCUMENTS

| | | |
|---|---|---|
| CN | 106859722 A | 6/2017 |
| DE | 19728337 A1 | 1/1999 |
| DE | 10201004476 A1 | 3/2012 |
| EP | 0380666 A1 | 8/1990 |
| EP | 0466518 A2 | 1/1992 |
| EP | 0534696 A1 | 3/1993 |
| EP | 1523957 A2 | 4/2005 |
| EP | 1557138 A1 | 8/2005 |
| EP | 1595504 A1 | 11/2005 |
| EP | 2074953 A1 | 1/2009 |
| EP | 2481381 A1 | 8/2012 |
| EP | 2928420 A1 | 10/2015 |
| EP | 3072461 A1 | 9/2016 |
| EP | 3372173 A2 | 9/2018 |
| FR | 2728457 A1 | 6/1996 |
| JP | 2003532457 A | 11/2003 |
| JP | 2005324019 A | 11/2005 |
| JP | 2007513684 A | 5/2007 |
| JP | 2009160402 A | 7/2009 |
| JP | 2012501793 A | 1/2012 |
| WO | 8800459 A1 | 1/1988 |
| WO | 9015582 A1 | 12/1990 |
| WO | 9313712 A1 | 7/1993 |
| WO | 9501669 A1 | 1/1995 |
| WO | 9504132 A1 | 2/1995 |
| WO | 9522359 A1 | 8/1995 |
| WO | 9601591 A1 | 1/1996 |
| WO | 9619159 A1 | 6/1996 |
| WO | 9640356 A1 | 12/1996 |
| WO | 9721402 A1 | 6/1997 |
| WO | 9726939 A1 | 7/1997 |
| WO | 9728749 A1 | 8/1997 |
| WO | 9735522 A1 | 10/1997 |
| WO | 9802100 A1 | 1/1998 |
| WO | 9803656 A1 | 1/1998 |
| WO | 9817187 A1 | 4/1998 |
| WO | 9822026 A1 | 5/1998 |
| WO | 9823322 A1 | 6/1998 |
| WO | 9827868 A1 | 7/1998 |
| WO | 9846115 A2 | 10/1998 |
| WO | 9901087 A1 | 1/1999 |
| WO | 9904724 A1 | 2/1999 |
| WO | 9905977 A1 | 2/1999 |
| WO | 9907289 A1 | 2/1999 |
| WO | 9908607 A1 | 2/1999 |
| WO | 9923976 A1 | 5/1999 |
| WO | 9925252 A1 | 5/1999 |
| WO | 9930640 A1 | 6/1999 |
| WO | 9944510 A1 | 9/1999 |
| WO | 9959479 A1 | 11/1999 |
| WO | 0001308 A1 | 1/2000 |
| WO | 0016705 A1 | 3/2000 |
| WO | 0027292 A1 | 5/2000 |
| WO | 0035352 A1 | 6/2000 |
| WO | 0053120 A1 | 9/2000 |
| WO | 0067669 A1 | 11/2000 |
| WO | 0067679 A1 | 11/2000 |
| WO | 0108743 A1 | 2/2001 |
| WO | 0115629 A1 | 3/2001 |
| WO | 0115650 A1 | 3/2001 |
| WO | 0117462 A1 | 3/2001 |
| WO | 0121247 A1 | 3/2001 |
| WO | 0126726 A1 | 4/2001 |
| WO | 0130266 A1 | 5/2001 |
| WO | 0130267 A1 | 5/2001 |
| WO | 0130268 A1 | 5/2001 |
| WO | 0170119 A1 | 9/2001 |
| WO | 0215793 A2 | 2/2002 |
| WO | 0224106 A2 | 3/2002 |
| WO | 02071977 A2 | 9/2002 |
| WO | 03007825 A1 | 1/2003 |
| WO | 03008030 A2 | 1/2003 |
| WO | 03032818 A1 | 4/2003 |
| WO | 0303945 A2 | 5/2003 |
| WO | 03047468 A1 | 6/2003 |
| WO | 03084443 A1 | 10/2003 |
| WO | 2004012629 A1 | 2/2004 |
| WO | 2004019825 A1 | 3/2004 |
| WO | 2004021893 A1 | 3/2004 |
| WO | 2004023980 A1 | 3/2004 |
| WO | 2004030568 A2 | 4/2004 |
| WO | 2004030569 A2 | 4/2004 |
| WO | 2004030570 A2 | 4/2004 |
| WO | 2004032724 A2 | 4/2004 |
| WO | 2004032796 A2 | 4/2004 |
| WO | 2004037128 A1 | 5/2004 |
| WO | 2004037317 A2 | 5/2004 |

(56) References Cited

FOREIGN PATENT DOCUMENTS

| | | | |
|---|---|---|---|
| WO | 2004039432 | A2 | 5/2004 |
| WO | 2004043265 | A2 | 5/2004 |
| WO | 2004043273 | A2 | 5/2004 |
| WO | 2004043293 | A2 | 5/2004 |
| WO | 2004045370 | A2 | 6/2004 |
| WO | 2004045378 | A2 | 6/2004 |
| WO | 2004045463 | A2 | 6/2004 |
| WO | 2004047677 | A2 | 6/2004 |
| WO | 2004060217 | A1 | 7/2004 |
| WO | 2004060470 | A1 | 7/2004 |
| WO | 2004062725 | A1 | 7/2004 |
| WO | 2004066803 | A2 | 8/2004 |
| WO | 2004066826 | A2 | 8/2004 |
| WO | 2004069287 | A2 | 8/2004 |
| WO | 2004075789 | A2 | 9/2004 |
| WO | 2004080352 | A1 | 9/2004 |
| WO | 2004082523 | A2 | 9/2004 |
| WO | 2004082527 | A2 | 9/2004 |
| WO | 2004082528 | A2 | 9/2004 |
| WO | 2004082536 | A1 | 9/2004 |
| WO | 2004082537 | A1 | 9/2004 |
| WO | 2004082538 | A2 | 9/2004 |
| WO | 2004082757 | A1 | 9/2004 |
| WO | 2004084746 | A2 | 10/2004 |
| WO | 2004084770 | A1 | 10/2004 |
| WO | 2004089246 | A2 | 10/2004 |
| WO | 2004089250 | A1 | 10/2004 |
| WO | 2004089253 | A1 | 10/2004 |
| WO | 2004091449 | A1 | 10/2004 |
| WO | 2004091454 | A1 | 10/2004 |
| WO | 2004093638 | A2 | 11/2004 |
| WO | 2004093726 | A2 | 11/2004 |
| WO | 2004093728 | A2 | 11/2004 |
| WO | 2004093730 | A2 | 11/2004 |
| WO | 2004093745 | A1 | 11/2004 |
| WO | 2004093935 | A2 | 11/2004 |
| WO | 2004096100 | A1 | 11/2004 |
| WO | 2004103222 | A1 | 12/2004 |
| WO | 2004103223 | A1 | 12/2004 |
| WO | 2004105584 | A2 | 12/2004 |
| WO | 2004105651 | A1 | 12/2004 |
| WO | 2004112582 | A2 | 12/2004 |
| WO | 2004112585 | A2 | 12/2004 |
| WO | 2004112643 | A2 | 12/2004 |
| WO | 2004112652 | A2 | 12/2004 |
| WO | 2004112657 | A1 | 12/2004 |
| WO | 2004112658 | A1 | 12/2004 |
| WO | 200502424 | A2 | 1/2005 |
| WO | 2005000152 | A2 | 1/2005 |
| WO | 2005002466 | A2 | 1/2005 |
| WO | 2005004753 | A1 | 1/2005 |
| WO | 2005007017 | A2 | 1/2005 |
| WO | 2005007018 | A2 | 1/2005 |
| WO | 2005007036 | A1 | 1/2005 |
| WO | 2005007037 | A1 | 1/2005 |
| WO | 2005009285 | A2 | 2/2005 |
| WO | 2005009505 | A2 | 2/2005 |
| WO | 2005009506 | A2 | 2/2005 |
| WO | 2005011473 | A2 | 2/2005 |
| WO | 2005011534 | A1 | 2/2005 |
| WO | 2005011535 | A2 | 2/2005 |
| WO | 2005013860 | A2 | 2/2005 |
| WO | 20050098286 | A2 | 2/2005 |
| WO | 2005018507 | A2 | 3/2005 |
| WO | 2005021063 | A2 | 3/2005 |
| WO | 2005023155 | A1 | 3/2005 |
| WO | 2005025644 | A2 | 3/2005 |
| WO | 2005027790 | A1 | 3/2005 |
| WO | 2005027797 | A1 | 3/2005 |
| WO | 2005049103 | A2 | 3/2005 |
| WO | 2005034812 | A1 | 4/2005 |
| WO | 2005039428 | A2 | 5/2005 |
| WO | 2005039452 | A1 | 5/2005 |
| WO | 2005046488 | A2 | 5/2005 |
| WO | 2005046528 | A1 | 5/2005 |
| WO | 2005046529 | A1 | 5/2005 |
| WO | 2005046530 | A1 | 5/2005 |
| WO | 2005046531 | A2 | 5/2005 |
| WO | 2005048883 | A1 | 6/2005 |
| WO | 2005051226 | A2 | 6/2005 |
| WO | 2005055811 | A2 | 6/2005 |
| WO | 2005055883 | A1 | 6/2005 |
| WO | 2005058206 | A1 | 6/2005 |
| WO | 2005065585 | A1 | 7/2005 |
| WO | 2005065593 | A1 | 7/2005 |
| WO | 2005065594 | A1 | 7/2005 |
| WO | 2005070342 | A1 | 8/2005 |
| WO | 2005070343 | A1 | 8/2005 |
| WO | 2005072654 | A1 | 8/2005 |
| WO | 2005072655 | A1 | 8/2005 |
| WO | 2005079706 | A1 | 9/2005 |
| WO | 2005082288 | A1 | 9/2005 |
| WO | 2005082289 | A1 | 9/2005 |
| WO | 2005084595 | A1 | 9/2005 |
| WO | 2005087139 | A1 | 9/2005 |
| WO | 2005087140 | A1 | 9/2005 |
| WO | 2006000763 | A2 | 1/2006 |
| WO | 2006000776 | A2 | 1/2006 |
| WO | 2006002492 | A1 | 1/2006 |
| WO | 2006004679 | A1 | 1/2006 |
| WO | 2006005015 | A2 | 1/2006 |
| WO | 2006009690 | A1 | 1/2006 |
| WO | 2006011127 | A2 | 2/2006 |
| WO | 2006012013 | A2 | 2/2006 |
| WO | 2006012038 | A2 | 2/2006 |
| WO | 2006012068 | A2 | 2/2006 |
| WO | 2006012111 | A1 | 2/2006 |
| WO | 2006012322 | A1 | 2/2006 |
| WO | 2006019498 | A2 | 2/2006 |
| WO | 2006026371 | A1 | 3/2006 |
| WO | 2006026377 | A1 | 3/2006 |
| WO | 2006026912 | A1 | 3/2006 |
| WO | 2006027499 | A2 | 3/2006 |
| WO | 2006028821 | A1 | 3/2006 |
| WO | 2006029062 | A1 | 3/2006 |
| WO | 2006031436 | A1 | 3/2006 |
| WO | 2006031469 | A1 | 3/2006 |
| WO | 2006032051 | A2 | 3/2006 |
| WO | 2006034114 | A2 | 3/2006 |
| WO | 2006034245 | A2 | 3/2006 |
| WO | 2006035415 | A2 | 4/2006 |
| WO | 2006041505 | A1 | 4/2006 |
| WO | 2006044679 | A1 | 4/2006 |
| WO | 2006048664 | A2 | 5/2006 |
| WO | 2006050459 | A2 | 5/2006 |
| WO | 2006050460 | A1 | 5/2006 |
| WO | 2006054107 | A2 | 5/2006 |
| WO | 2006054930 | A1 | 5/2006 |
| WO | 20060559982 | A2 | 5/2006 |
| WO | 2006060546 | A2 | 6/2006 |
| WO | 2006063108 | A1 | 6/2006 |
| WO | 2006063181 | A1 | 6/2006 |
| WO | 2006063199 | A2 | 6/2006 |
| WO | 2006064490 | A1 | 6/2006 |
| WO | 2006065212 | A1 | 6/2006 |
| WO | 2006065930 | A2 | 6/2006 |
| WO | 2006066148 | A2 | 6/2006 |
| WO | 2006066150 | A2 | 6/2006 |
| WO | 2006069094 | A1 | 6/2006 |
| WO | 2006070372 | A2 | 7/2006 |
| WO | 2006073628 | A1 | 7/2006 |
| WO | 2006076890 | A1 | 7/2006 |
| WO | 2006127765 | A1 | 11/2006 |
| WO | 2007044536 | A1 | 4/2007 |
| WO | 2010024801 | A1 | 3/2010 |
| WO | 2010081033 | A1 | 7/2010 |
| WO | 2013060855 | A1 | 5/2013 |
| WO | 2013159065 | A1 | 10/2013 |
| WO | 2014011865 | A1 | 1/2014 |
| WO | 2014018907 | A1 | 1/2014 |
| WO | 2014089129 | A1 | 6/2014 |
| WO | 2014106239 | A1 | 7/2014 |
| WO | 2015164836 | A1 | 10/2015 |
| WO | 2016087145 | A1 | 6/2016 |

(56) References Cited

FOREIGN PATENT DOCUMENTS

| WO | 2018017935 A1 | 1/2018 |
|---|---|---|
| WO | 2018187732 A1 | 10/2018 |
| WO | 2019084358 A1 | 5/2019 |

OTHER PUBLICATIONS

International Search Report and Written Opinion dated Aug. 3, 2004 for International Application No. PCT/US2004/008109.
International Search Report and Written Opinion dated Feb. 15, 2000 for International Application No. PCT/US99/26325.
International Search Report dated May 20, 2003 for International Application No. PCT/US02/33808.
Written Opinion dated Nov. 17, 2003 for International Application No. PCT/US/02/33808.
International Search Report and Written Opinion dated Aug. 21, 2018 for International Application No. PCT/US2018/029684.
Cragg et al., "A New Percutaneous Vena Cava Filter," American Journal of Radiology, Sep. 1983, pp. 601-604, vol. 141.
Cragg et al, "Nonsurgical Placement of Arterial Endoprostheses: A New Technique Using Nitinol Wire," Radiology, Apr. 1983, pp. 261-263, vol. 147, No. 1.
Lock et al., "Transcatheter Closure of Atrial Septal Defects." Circulation, May 1989, pp. 1091-1099, vol. 79, No. 5.
Lock et al., "Transcatheter Umbrella Closure of Congenital Heart Defects," Circulation, Mar. 1987, pp. 593-599, vol. 75, No. 3.
Rashkind et al., "Nonsurgical closure of patent ductus arteriosus: clinical application of the Rashkind PDA Occluder System," Circulation, Mar. 1987, pp. 583-592, vol. 75, No. 3.
Rosengart et al., "Percutaneous and Minimally Invasive Valve Procedures," Circulation, Apr. 1, 2008, pp. 1750-1767, vol. 117.
Ruttenberg, "Nonsurgical Therapy of Cardiac Disorders," Pediatric Consult, 1986, Pages not numbered, vol. 5, No. 2.
Sugita et al., "Nonsurgical Implantations of a Vascular Ring Prosthesis Using Thermal Shape Memory Ti/Ni Alloy (Nitinol Wire)," Trans. Am. Soc. Artif. Intern. Organs, 1986, pp. 30-34, vol. XXXII.
Wessel et al., "Outpatient Closure of the Patent Ductus Arteriousus," Circulation, 1988, pp. 1068-1071, vol. 77, No. 5.
Tung et al., U.S. Appl. No. 61/559,941, filed Nov. 15, 2011.
Yue Yu et al., U.S. Appl. No. 61/557,880, filed Dec. 20, 2011.
Cline, "File: Fish hooks.jpg," Wikipedia foundation , Inc., San Francisco, CA, Jun. 2007; p. 1 of 4; available online at http://en.wikipedia.org/wiki/File:Fish_hooks.jpg; last accessed Oct. 5, 2012.
International Search Report and Written Opinion dated Apr. 22, 2014 for International Application No. PCT/US2013/078454.
Aryana et al., "Incomplete Closure of the Left Atrial Appendage: Implication and Management." Curr Cardiol Rep., 18(9):82, 2016.
Delurgio, "Device-Associated Thrombus and Peri-Device Leak Following Left Atrial Appendage Closure with the Amplatzer Cardiac Plug." JACC: Cardiovascular Interventions, 10(4): 400-402, 2017.
University of Minnesota. Atlas of Human Cardiac Anatomy, Left Atrium. Retrieved from http://www.vhlab.umn.edu/atlas/left-atrium/left-atrial-appendage/index.shtml. Accessed 2017. Downloaded 2019.
Saw et al., "Incidence and Clinical Impact of Device-Associated Thrombus and Peri-Device Leak following Left Atrial Appendage Closure with the Amplatzer Cardiac Plug." JACC: Cardiovascular Intervention. 10(4): 391-399, 2017.
Romero et al., "Left Atrial Appendage Closure Devices," Clinical Medicine Insights: Cardiology, vol. 8, pp. 45-52, 2014.
Invitation to Pay Additional Fees and, Where Applicable, Protest Fee, for International Application No. PCT/US2016/043363, mailed Oct. 13, 2016.
International Search Report and Written Opinion dated Oct. 14, 2019 for International Application No. PCT/US2019/047452.
International Search Report and Written Opinion dated Oct. 27, 2017 for International Application No. PCT/US2017/048150.
International Search Report and Written Opinion dated Jan. 21, 2019 for International Application No. PCT/US2018/051953.
International Search Report and Written Opinion dated Oct. 13, 2016 for International Application No. PCT/US2016/043363.
International Search Report and Written Opinion dated Mar. 17, 2020, for International Application No. PCT/US2019/065243.
International Search Report and Written Opinion dated Sep. 9, 2019 for International Application No. PCT/US2019/033698.
Blackshear et al; "Appendage Obliteration to Reduce Stroke in Cardiac Surgical Patients with Atrial Fibrillation", Ann. Thoracic Surgery, pp. 755-759, 1996.
Lindsay, "Obliteration of the Left Atrial Appendage: A Concept Worth Testing", Ann. Thoracic Surgery, 1996.
Invitation to Pay Additional Fees dated Feb. 22, 2019 for International Application No. PCT/US2018/066163.
International Search Report and Written Opinion dated Oct. 23, 2020 for International Application No. PCT/US2020/042192.
Extended European Search Report mailed Oct. 10, 2012, for EP Application No. 11178465.8.
International Search Report and Written Opinion for International Application PCT/US2008/008651, mailed on Nov. 25, 2008, 16 pages.

* cited by examiner

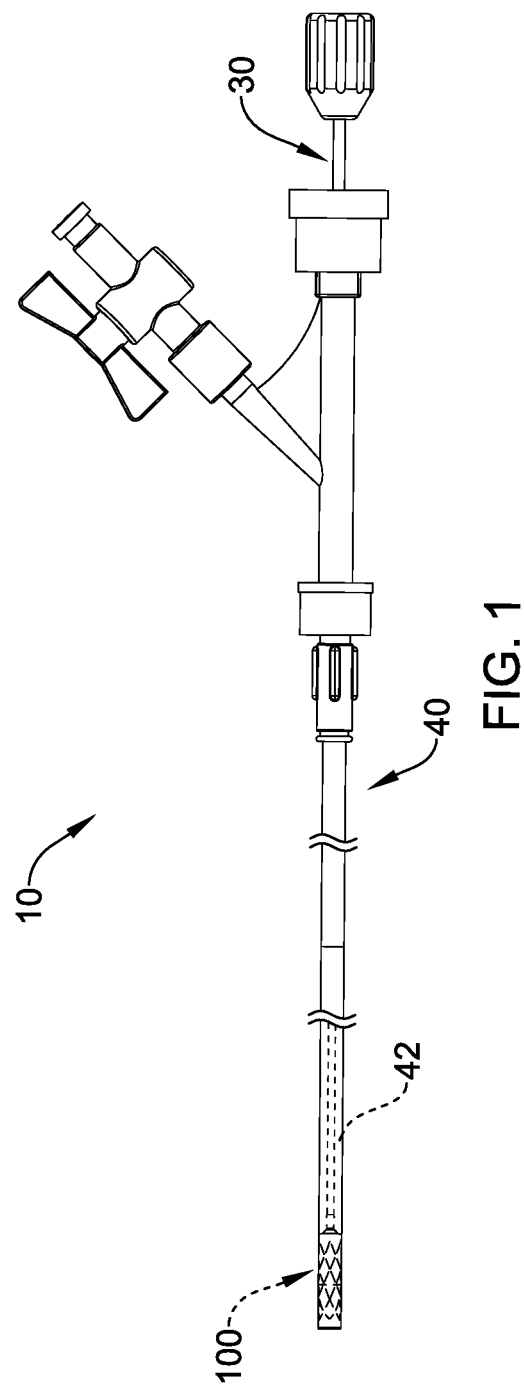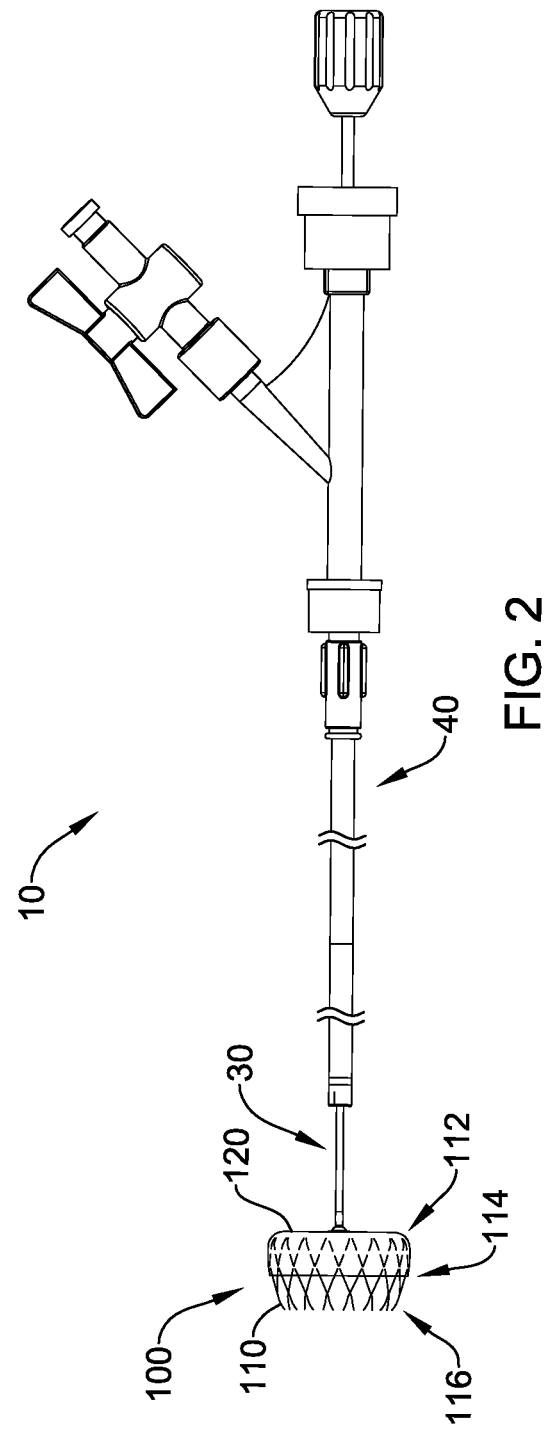

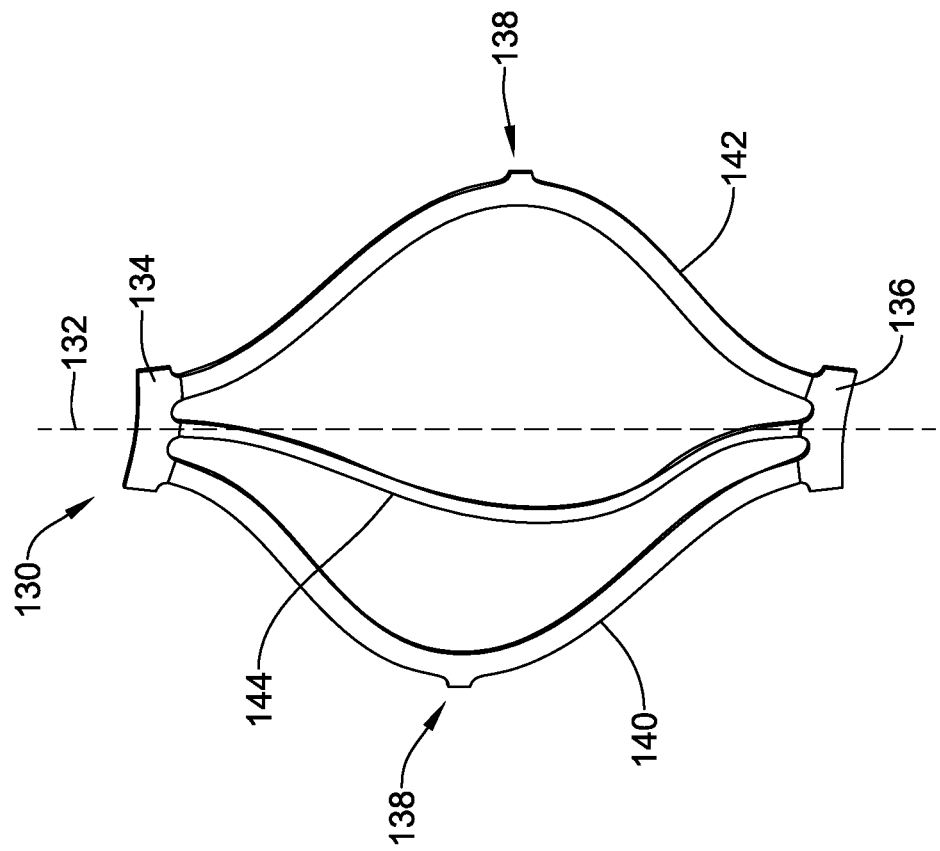
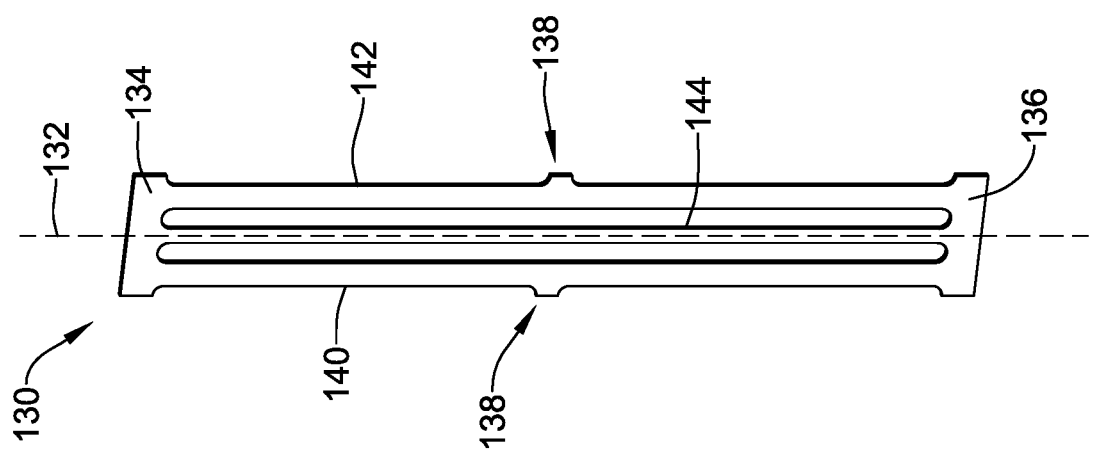

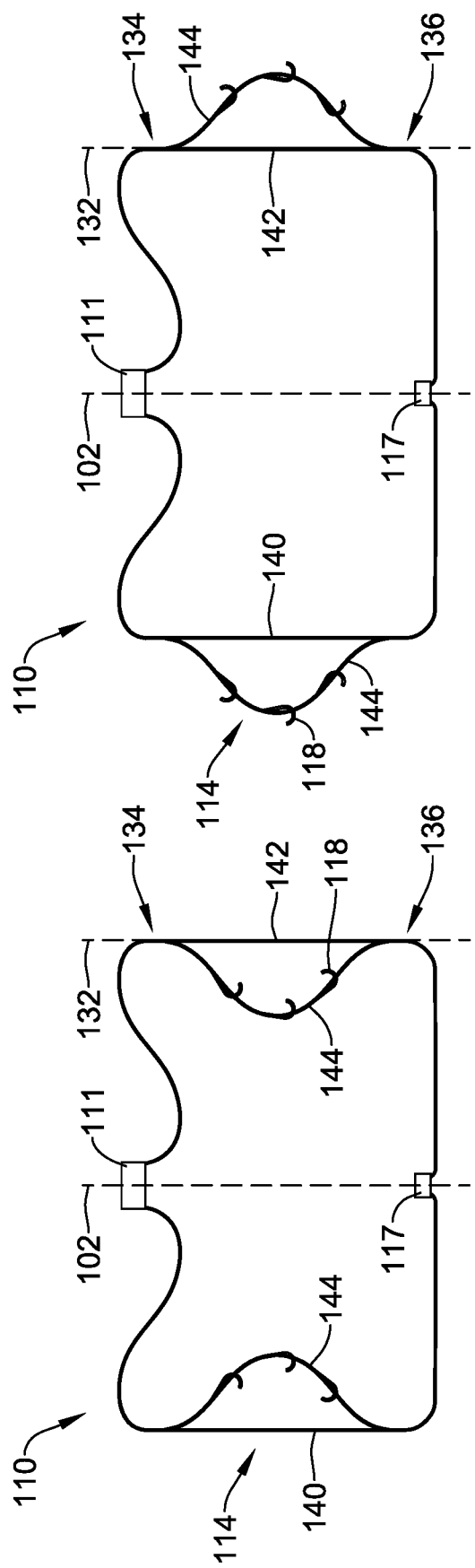

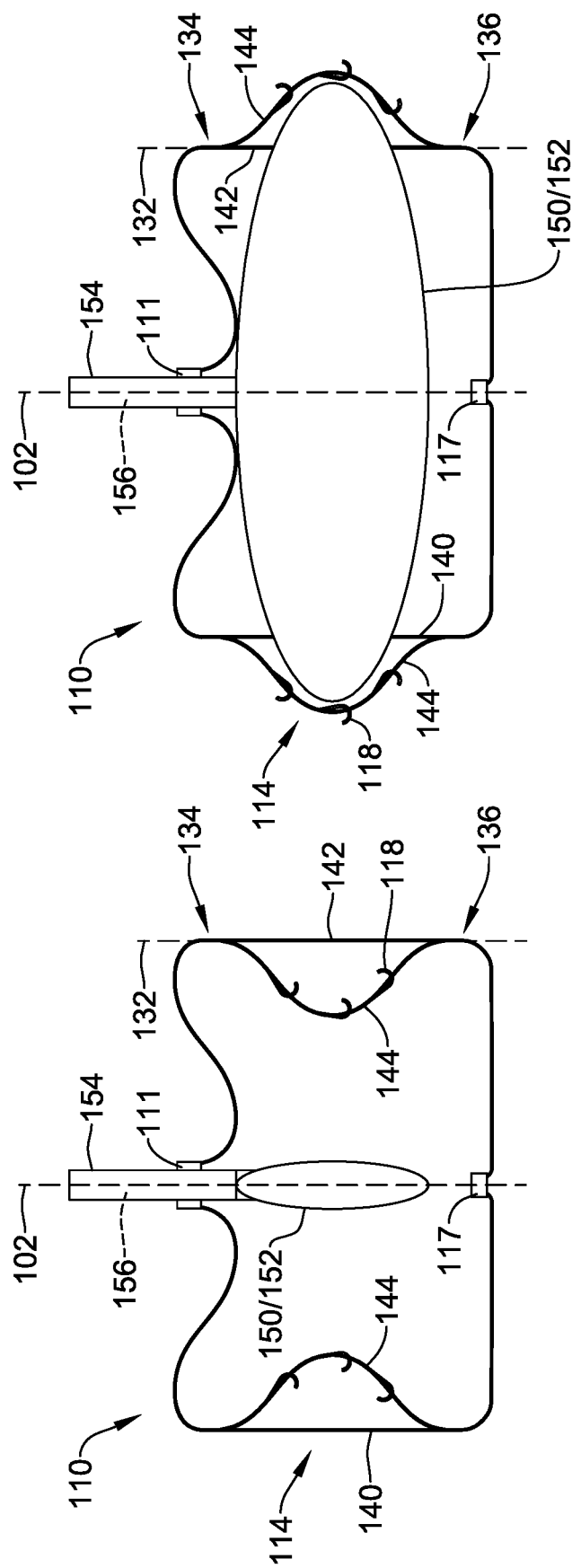

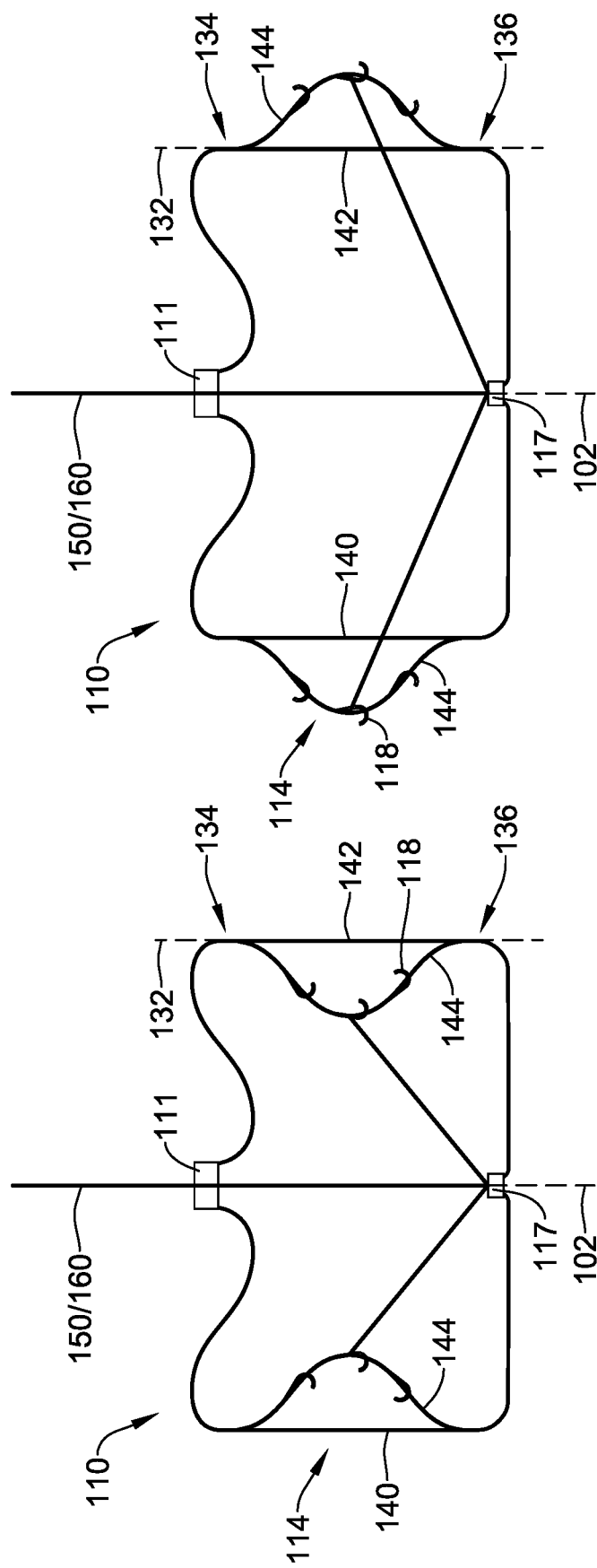

MEDICAL DEVICE FOR OCCLUDING A LEFT ATRIAL APPENDAGE

CROSS REFERENCE TO RELATED APPLICATIONS

This application claims the benefit of priority of U.S. Provisional Application No. 63/398,281 filed Aug. 16, 2022, the entire disclosure of which is hereby incorporated by reference.

TECHNICAL FIELD

The present disclosure pertains to medical devices and systems, and methods for manufacturing and using medical devices and systems. More particularly, the present disclosure pertains to medical implants for occluding a left atrial appendage.

BACKGROUND

Diseases and/or medical conditions that impact the cardiovascular system are prevalent throughout the world. Traditionally, treatment of the cardiovascular system was often conducted by directly accessing the impacted part of the system. More recently, less invasive therapies have been developed, and have gained wide acceptance among patients and clinicians.

Atrial fibrillation is a common sustained cardiac arrhythmia affecting over 30 million people worldwide, according to some estimates. Atrial fibrillation is the irregular, chaotic beating of the upper chambers of the heart. Electrical impulses discharge so rapidly that the atrial muscle quivers or fibrillates. Episodes of atrial fibrillation may last a few minutes or several days. The most serious consequence of atrial fibrillation is ischemic stroke. It has been estimated that up to 20% of all strokes are related to atrial fibrillation. Most atrial fibrillation patients, regardless of the severity of their symptoms or frequency of episodes, require treatment to reduce the risk of stroke. The left atrial appendage is a small organ attached to the left atrium of the heart as a pouch-like extension. In patients suffering from atrial fibrillation, the left atrial appendage may not properly contract with the left atrium, causing stagnant blood to pool within its interior, which can lead to the undesirable formation of thrombi within the left atrial appendage. Thrombi forming in the left atrial appendage may break loose from this area and enter the blood stream. Thrombi that migrate through the blood vessels may eventually plug a smaller vessel downstream and thereby contribute to stroke or heart attack. Clinical studies have shown that the majority of blood clots in patients with atrial fibrillation are found in the left atrial appendage. As a treatment, medical devices have been developed which are positioned in the left atrial appendage and deployed to close off the ostium of the left atrial appendage. Over time, the exposed surface(s) spanning the ostium of the left atrial appendage becomes covered with tissue (a process called endothelization), effectively removing the left atrial appendage from the circulatory system and reducing or eliminating the number of thrombi which may enter the blood stream from the left atrial appendage.

The disclosure relates to medical implants for occluding the left atrial appendage. Of the known medical devices, systems, and methods, each has certain advantages and disadvantages. There is an ongoing need to provide alternative medical devices and systems, as well as alternative methods for manufacturing and using medical devices and systems.

SUMMARY

In one example, a medical implant for occluding a left atrial appendage may comprise an expandable framework configured to shift radially relative to a central longitudinal axis between a first configuration and a second configuration, and an occlusive element secured to the expandable framework. The expandable framework may include a plurality of strut groups, each strut group comprising a longitudinal axis extending from a first joint to a second joint, a first strut extending from the first joint to the second joint, a second strut extending from the first joint to the second joint, and a third strut disposed between the first strut and the second strut. The first strut may be disposed in a first position in the first configuration and a second position in the second configuration, the first strut moving laterally in a first direction relative to the longitudinal axis from the first position to the second position. The second strut may be disposed in a first position in the first configuration and a second position in the second configuration, the second strut moving laterally in a second direction relative to the longitudinal axis from the first position to the second position. The third strut may be disposed in a first position in the first configuration and is configured to shift radially relative to the longitudinal axis from the first position in the first configuration to a second position in the second configuration.

In addition or alternatively to any example described herein, the second position of the third strut is disposed radially inward from the longitudinal axis.

In addition or alternatively to any example described herein, in the second configuration the third strut is configured to selectively shift radially outward from the second position to a third position radially outward of the first position.

In addition or alternatively to any example described herein, the third strut is selectively shifted from the second position to the third position using an actuation element.

In addition or alternatively to any example described herein, the actuation element is an expandable member disposed within the expandable framework.

In addition or alternatively to any example described herein, the actuation element is at least one tether disposed within the expandable framework.

In addition or alternatively to any example described herein, the third strut is pulled radially inward by the at least one tether as the expandable framework shifts from the first configuration to the second configuration.

In addition or alternatively to any example described herein, subsequently releasing the at least one tether in the second configuration permits the third strut to shift to the third position.

In addition or alternatively to any example described herein, the second position of the third strut is disposed radially outward from the longitudinal axis.

In addition or alternatively to any example described herein, the third strut of each strut group includes at least one anchor member extending radially outward from the third strut in the second configuration.

In addition or alternatively to any example described herein, the plurality of strut groups defines a body region of the expandable framework.

In addition or alternatively to any example described herein, the plurality of strut groups defines a shoulder region of the expandable framework.

In addition or alternatively to any example described herein, in the first configuration, the first strut, the second strut, and the third strut of each strut group are of equal length.

In addition or alternatively to any example described herein, a medical implant for occluding a left atrial appendage may comprise an expandable framework configured to shift radially relative to a central longitudinal axis between a first configuration and a second configuration, and an occlusive element secured to the expandable framework. The expandable framework may include a plurality of strut groups, each strut group of the plurality of strut groups comprising a longitudinal axis extending from a first joint to a second joint, a first strut extending from the first joint to the second joint, a second strut extending from the first joint to the second joint, and a third strut disposed between the first strut and the second strut. The first strut, the second strut, and a majority of the third strut of each strut group of the plurality of strut groups may be oriented parallel to each other in the first configuration and nonparallel to each other in the second configuration. Each of the plurality of strut groups is attached to another strut group of the plurality of strut groups at one of a plurality of body joints.

In addition or alternatively to any example described herein, the third strut is disposed circumferentially between the first strut and the second strut relative to the central longitudinal axis.

In addition or alternatively to any example described herein, the first strut of one of the plurality of strut groups is attached to the second strut of a first adjacent strut group at a first body joint of the plurality of body joints, and the second strut of the one of the plurality of strut groups is attached to the first strut of a second adjacent strut group at a second body joint of the plurality of body joints, the second adjacent strut group disposed on an opposite side of the one of the plurality of strut groups from the first adjacent strut group.

In addition or alternatively to any example described herein, the first strut is disposed in a first position in the first configuration and a second position in the second configuration, the first strut moving laterally in a first direction relative to the longitudinal axis from the first position to the second position. The second strut is disposed in a first position in the first configuration and a second position in the second configuration, the second strut moving laterally in a second direction relative to the longitudinal axis from the first position to the second position. The third strut is disposed in a first position in the first configuration and is configured to shift radially relative to the longitudinal axis from the first position in the first configuration to a second position in the second configuration.

In addition or alternatively to any example described herein, the plurality of strut groups is formed from a single monolithic piece of material.

In addition or alternatively to any example described herein, a medical device system may comprise a catheter, a core wire movably disposed within a lumen of the catheter, and a medical implant for occluding a left atrial appendage releasably connected to a distal portion of the core wire. The medical implant may include an expandable framework configured to shift radially relative to a central longitudinal axis between a first configuration and a second configuration, and an occlusive element secured to the expandable framework. The expandable framework may include a plurality of strut groups, each strut group comprising a longitudinal axis extending from a first joint to a second joint, a first strut extending from the first joint to the second joint, a second strut extending from the first joint to the second joint, and a third strut disposed between the first strut and the second strut.

In addition or alternatively to any example described herein, the expandable framework is disposed in the first configuration when the medical implant is disposed within the lumen of the catheter and the expandable framework is configured to shift toward the second configuration when the medical implant is disposed outside of the lumen of the catheter.

The above summary of some embodiments, aspects, and/or examples is not intended to describe each disclosed embodiment or every implementation of the present disclosure. The figures and detailed description which follow more particularly exemplify these embodiments.

BRIEF DESCRIPTION OF THE DRAWINGS

The disclosure may be more completely understood in consideration of the following detailed description in connection with the accompanying drawings, in which:

FIGS. 1-2 are side views of an example medical device system;

FIG. 4 illustrates one of a plurality of strut groups of the expandable framework in a first configuration;

FIG. 5 illustrates one of the plurality of strut groups of the expandable framework in a second configuration;

FIGS. 8-9 are partial cross-sectional views illustrating selected aspects of one embodiment of the expandable framework in the first configuration and the second configuration;

FIGS. 10-11 are partial cross-sectional views illustrating selected aspects of one embodiment of the expandable framework in the first configuration and the second configuration;

FIGS. 12-13 are partial cross-sectional views illustrating selected aspects of one embodiment of the expandable framework in the first configuration and the second configuration;

Figure 3:
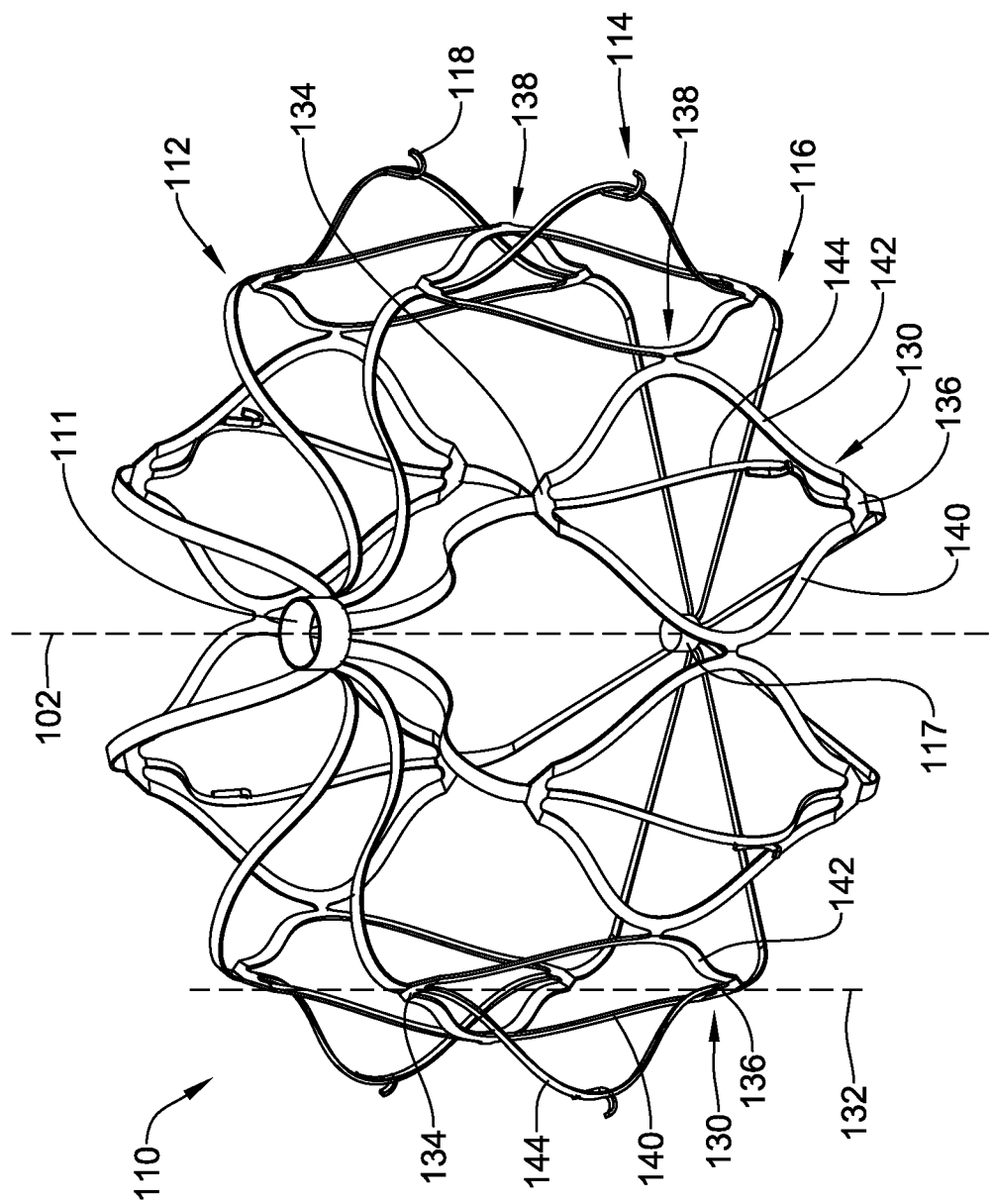
FIG. 3 is a perspective view illustrating selected aspects of an expandable framework of the medical implant of FIGS. 1-2.

While aspects of the disclosure are amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DETAILED DESCRIPTION

The following description should be read with reference to the drawings, which are not necessarily to scale, wherein like reference numerals indicate like elements throughout the several views. The detailed description and drawings are intended to illustrate but not limit the disclosure. Those skilled in the art will recognize that the various elements described and/or shown may be arranged in various combinations and configurations without departing from the scope of the disclosure. The detailed description and drawings illustrate exemplary aspects of the disclosure.

For the following defined terms, these definitions shall be applied, unless a different definition is given in the claims or elsewhere in this specification.

All numeric values are herein assumed to be modified by the term "about," whether or not explicitly indicated. The term "about", in the context of numeric values, generally refers to a range of numbers that one of skill in the art would consider equivalent to the recited value (e.g., having the same function or result). In many instances, the term "about" may include numbers that are rounded to the nearest significant figure. Other uses of the term "about" (e.g., in a context other than numeric values) may be assumed to have their ordinary and customary definition(s), as understood from and consistent with the context of the specification, unless otherwise specified.

The recitation of numerical ranges by endpoints includes all numbers within that range, including the endpoints (e.g., 1 to 5 includes 1, 1.5, 2, 2.75, 3, 3.80, 4, and 5).

Although some suitable dimensions, ranges, and/or values pertaining to various components, features and/or specifications are disclosed, one of skill in the art, incited by the present disclosure, would understand desired dimensions, ranges, and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise. It is to be noted that in order to facilitate understanding, certain features of the disclosure may be described in the singular, even though those features may be plural or recurring within the disclosed embodiment(s). Each instance of the features may include and/or be encompassed by the singular disclosure(s), unless expressly stated to the contrary. It shall be understood that the discussion(s) herein may apply equally to any and/or all of the components for which there are more than one, unless explicitly stated to the contrary.

Relative terms such as "proximal", "distal", "advance", "retract", variants thereof, and the like, may be generally considered with respect to the positioning, direction, and/or operation of various elements relative to a user/operator/manipulator of the device, wherein "proximal" and "retract" indicate or refer to closer to or toward the user and "distal" and "advance" indicate or refer to farther from or away from the user. In some instances, the terms "proximal" and "distal" may be arbitrarily assigned in an effort to facilitate understanding of the disclosure, and such instances will be readily apparent to the skilled artisan. Other relative terms, such as "upstream", "downstream", "inflow", and "outflow" refer to a direction of fluid flow within a lumen, such as a body lumen, a blood vessel, or within a device. Still other relative terms, such as "axial", "circumferential", "longitudinal", "lateral", "radial", etc. and/or variants thereof generally refer to direction and/or orientation relative to a central longitudinal axis of the disclosed structure or device.

The term "extent" may be understood to mean the greatest measurement of a stated or identified dimension, unless the extent or dimension in question is preceded by or identified as a "minimum", which may be understood to mean the smallest measurement of the stated or identified dimension. For example, "outer extent" may be understood to mean the maximum outer dimension, "radial extent" may be understood to mean the maximum radial dimension, "longitudinal extent" may be understood to mean the maximum longitudinal dimension, etc. Each instance of an "extent" may be different (e.g., axial, longitudinal, lateral, radial, circumferential, etc.) and will be apparent to the skilled person from the context of the individual usage. In some instances, an "extent" may be measured orthogonally within a plane and/or cross-section, but may be, as will be apparent from the particular context, measured differently—such as, but not limited to, angularly, radially, circumferentially (e.g., along an arc), etc.

The terms "monolithic" and "unitary" shall generally refer to an element or elements made from or consisting of a single structure or base unit/element. A monolithic and/or unitary element shall exclude structure and/or features made by assembling or otherwise joining multiple discrete structures or elements together.

It is noted that references in the specification to "an embodiment", "some embodiments", "other embodiments", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to use the particular feature, structure, or characteristic in connection with other embodiments, whether or not explicitly described, unless clearly stated to the contrary. That is, the various individual elements described below, even if not explicitly shown in a particular combination, are nevertheless contemplated as being combinable or arrangeable with each other to form other additional embodiments or to complement and/or enrich the described embodiment(s), as would be understood by one of ordinary skill in the art.

For the purpose of clarity, certain identifying numerical nomenclature (e.g., first, second, third, fourth, etc.) may be used throughout the description and/or claims to name and/or differentiate between various described and/or claimed features. It is to be understood that the numerical nomenclature is not intended to be limiting and is exemplary only. In some embodiments, alterations of and deviations from previously used numerical nomenclature may be made in the interest of brevity and clarity. That is, a feature identified as a "first" element may later be referred to as a "second" element, a "third" element, etc. or may be omitted entirely, and/or a different feature may be referred to as the "first" element. The meaning and/or designation in each instance will be apparent to the skilled practitioner.

The figures illustrate selected components and/or arrangements of medical implants, systems, and methods of manufacturing the same. It should be noted that in any given figure, some features of the medical implants, systems, and methods may not be shown, or may be shown schematically, for simplicity. Additional details regarding some elements may be illustrated in other figures in greater detail. The devices and/or methods disclosed herein may provide a number of desirable features and benefits as described in more detail below.

FIGS. 1-2 schematically illustrate selected components and/or arrangements of a medical device system 10. The medical device system 10 may be used to deliver and/or deploy a variety of medical implants (e.g., a cardiovascular medical implant, an occlusive medical implant, etc.) to one or more locations within the anatomy of a patient including but not limited to the heart and/or the vasculature.

The medical device system 10 may include a catheter 40 having a lumen 42 extending from a proximal opening to a distal opening, a core wire 30 movably and/or slidably disposed within the lumen 42, and a medical implant 100 (e.g., a cardiovascular medical implant, an occlusive medical implant, etc.). The medical implant 100 is shown schematically and variations and/or alterations of the example shown are contemplated. The medical implant 100 may be configured to occlude the left atrial appendage of the patient.

The medical implant 100 may include an expandable framework 110 configured to shift between a first configuration (e.g., FIG. 1), wherein the medical implant 100 is disposed within the lumen 42 proximate the distal opening in the first configuration, and a second configuration (e.g., FIG. 2), wherein the medical implant 100 and/or the expandable framework 110 is configured to shift radially relative to a central longitudinal axis 102 (e.g., FIG. 3) between the first configuration and the second configuration when the medical implant 100 is disposed distal of the distal opening of the lumen 42 and/or the catheter 40, and/or when the medical implant 100 is unconstrained by the catheter 40. As shown in FIG. 2, as discussed in additional detail herein, the expandable framework 110 may include a shoulder region 112, a body region 114, and/or a distal region 116.

In some embodiments, the medical implant 100 may include an occlusive element 120 disposed on and/or secured to the expandable framework 110. In some embodiments, the occlusive element 120 may be disposed on, along, and/or over an exterior surface of the expandable framework 110. Alternatively, in some embodiments, the occlusive element 120 may encapsulate and/or embed at least a portion of the expandable framework 110 therein.

In some embodiments, the occlusive element 120 may be and/or may include a porous mesh. In some embodiments, the occlusive element 120 and/or the porous mesh may be a woven structure, a fabric structure, a textile structure, and/or a membrane or film having a plurality of apertures formed therein and/or extending therethrough.

In some embodiments, the occlusive element 120 may cover at least 20% of the expandable framework 110 in the second configuration. In some embodiments, the occlusive element 120 may cover at least 30% of the expandable framework 110 in the second configuration. In some embodiments, the occlusive element 120 may cover at least 40% of the expandable framework 110 in the second configuration. In some embodiments, the occlusive element 120 may cover at least 50% of the expandable framework 110 in the second configuration. In some embodiments, the occlusive element 120 may cover at least 60% of the expandable framework 110 in the second configuration. In some embodiments, the occlusive element 120 may cover at least 70% of the expandable framework 110 in the second configuration. Other configurations are also contemplated.

The medical implant 100 may be disposed at and/or releasably connected to a distal portion of the core wire 30. In some embodiments, the medical implant 100 may be releasably connected to the distal end of the core wire 30. The core wire 30 may be slidably and/or rotatably disposed within the lumen 42 of the catheter 40. In some embodiments, a proximal end of the core wire 30 may extend proximally of a proximal end of the catheter 40 and/or the proximal opening of the lumen 42 for manual manipulation by a clinician or practitioner.

Some suitable, but non-limiting, examples of materials for the medical device system 10, the core wire 30, the catheter 40, and/or the medical implant 100, etc. are discussed below. It is contemplated that any and/or all embodiments and/or configurations of the medical implant 100 disclosed herein may be used in accordance with and/or be associated with the medical device system 10 described above.

FIG. 3 illustrates some selected aspects of the medical implant 100 according to the disclosure. The medical implant 100 includes the expandable framework 110 configured to shift between the first configuration (e.g., FIG. 1) and the second configuration (e.g., FIGS. 2-3). The first configuration may be a radially collapsed configuration and the second configuration may be a radially expanded configuration. The expandable framework 110 may include a proximal hub 111 and/or a plurality of strut groups 130. In some embodiments, the plurality of strut groups 130 may extend from and/or may be connected to the proximal hub 111. In some embodiments, the expandable framework 110 may optionally include a distal hub 117.

The expandable framework 110 may have a central longitudinal axis 102 extending from the proximal hub 111 to the distal hub 117 (where present). The proximal hub 111 of the expandable framework 110 may be configured to releasably attach or connect to the distal end of the core wire 30. The proximal hub 111 of the expandable framework 110 may include a threaded insert (not shown) fixedly attached to the expandable framework 110, the threaded insert being configured to engage a threaded member disposed at the distal end of the core wire of the medical device system 10 to releasably connect the medical implant 100 to the distal end of the core wire 30. The expandable framework 110 may be disposed in the first configuration when the medical implant 100 is disposed within the lumen 42 of the catheter 40 of the medical device system 10. The expandable framework 110 may be configured to shift toward the second configuration when the medical implant 100 is disposed outside of the lumen 42 of the catheter 40 of the medical device system 10 and/or when the medical implant 100 and/or the expandable framework 110 is unconstrained by the catheter 40.

In some embodiments, each strut group of the plurality of strut groups 130 may include a longitudinal axis 132 extending from a first joint 134 to a second joint 136. In some embodiments, each strut group of the plurality of strut groups 130 may include a first strut 140 extending from the first joint 134 to the second joint 136, a second strut 142 extending from the first joint 134 to the second joint 136, and a third strut 144 extending from the first joint 134 to the second joint 136. The third strut 144 may be disposed circumferentially (relative to the central longitudinal axis 102) between the first strut 140 and the second strut 142. Other configurations are also contemplated.

In some embodiments, the first strut 140, the second strut 142, and/or the third strut 144 of each strut group of the plurality of strut groups 130 may be oriented parallel to each other in the first configuration (e.g., FIG. 1, FIG. 4) and nonparallel to each other in the second configuration (e.g., FIG. 2, FIG. 5). In some embodiments, the first strut 140, the second strut 142, and/or the third strut 144 may be generally coplanar in the first configuration. In some embodiments, the first strut 140, the second strut 142, and/or the third strut 144 may be disposed along a curve or an arc around the central longitudinal axis 102 in the first configuration. Each strut group of the plurality of strut groups 130 may be fixedly attached to another strut group of the plurality of strut groups 130 at one of a plurality of body joints 138. Some additional details regarding the plurality of strut groups 130 and individual struts thereof are discussed below.

As may be seen in FIG. 3, in at least some embodiments, the first strut 140 of one of the plurality of strut groups 130 may be fixedly attached to the second strut 142 of a first circumferentially adjacent strut group of the plurality of strut groups 130 at a first body joint of the plurality of body joints 138, and the second strut 142 of the one of the plurality of strut groups 130 may be fixedly attached to the first strut 140 of a second circumferentially adjacent strut group of the plurality of strut groups 130 at a second body joint of the plurality of body joints 138. The second circumferentially adjacent strut group of the plurality of strut groups 130 may be disposed on an opposite side of the one of the plurality of strut groups 130 from the first circumferentially adjacent strut group of the plurality of strut groups 130. In at least some embodiments, the plurality of strut groups 130 may be formed from a single monolithic piece of material (e.g., a tubular member, a flat sheet, etc.). In some embodiments, the expandable framework 110 as a whole may be formed from a single monolithic piece of material (e.g., a tubular member, a flat sheet, etc.). Other configurations are also contemplated.

In at least some embodiments, the first joint 134 may be disposed proximate a proximal end and/or the shoulder region 112 of the expandable framework 110. In some embodiments, the first joint 134 may be disposed closer to the proximal end and/or the shoulder region 112 of the expandable framework 110 than the second joint 136. In some embodiments, the second joint 136 may be disposed proximate a distal end and/or the distal region 116 of the expandable framework 110. In some embodiments, the second joint 136 may be disposed closer to the distal end and/or the distal region 116 of the expandable framework 110 than the first joint 134. In some embodiments, the plurality of strut groups 130 may define and/or may at least partially define the body region 114 of the expandable framework 110, as seen in FIG. 3, and additionally shown with respect to FIGS. 8-13, which are discussed in more detail below.

Turning now to FIG. 4, which illustrates a portion of the expandable framework 110 and/or one strut group of the plurality of strut groups 130, the first strut 140 may be disposed in a first position (e.g., FIG. 1, FIG. 4) in the first configuration. The second strut 142 may be disposed in a first position (e.g., FIG. 1, FIG. 4) in the first configuration. The third strut 144 may be disposed in a first position (e.g., FIG. 1, FIG. 4) in the first configuration. In some embodiments, the third strut 144 may be at least partially coaxial and/or coincident with the longitudinal axis 132 in the first position and/or the first configuration. In some embodiments, the third strut 144 may be completely coaxial and/or coincident with the longitudinal axis 132 in the first position and/or the first configuration. As may be seen in FIG. 4, the third strut 144 may be disposed between the first strut 140 and the second strut 142. In some embodiments, the third strut 144 may be disposed circumferentially between the first strut 140 and the second strut 142 with respect to the central longitudinal axis 102 (e.g., FIG. 3). In some embodiments, the first strut 140 and the second strut 142 within the one strut group of the plurality of strut groups 130 may be disposed on opposite sides of the longitudinal axis 132 from each other.

In some embodiments, the first strut 140 may be disposed in a second position in the second configuration. For the purpose of illustration, the point of view of directions, orientations, and/or directional vectors discussed relative to the longitudinal axis 132 shall be understood to be as viewed from outside of the expandable framework 110 looking in toward the central longitudinal axis 102. In some embodiments, the central longitudinal axis 102 and the longitudinal axis 132 may be parallel in the first configuration (e.g., the radially collapsed configuration). In some embodiments, the central longitudinal axis 102 and the longitudinal axis 132 may be parallel in the second configuration (e.g., the radially expanded configuration). In some embodiments, the central longitudinal axis 102 and the longitudinal axis 132 may be nonparallel in the second configuration (e.g., the radially expanded configuration).

In at least some embodiments, the longitudinal axis 132 of one of the plurality of strut groups 130 and the central longitudinal axis 102 may be defined within a common plane containing both axes. As such, the longitudinal axis 132 of each strut group and the central longitudinal axis 102 may be defined within one common plane. Overall, the expandable framework 110 and/or the plurality of strut groups 130 may include and/or define a plurality of common planes equal in number/quantity to the total number of strut groups in the plurality of strut groups 130. Each of the plurality of common planes may include the central longitudinal axis 102 and thus the plurality of common planes may form an array of planes extending outward from the central longitudinal axis 102. In some embodiments, the longitudinal axis 132 of more than one strut group (e.g., two strut groups) may be disposed within one common plane along with the central longitudinal axis 102.

In some embodiments, the first strut 140 may move laterally in a first direction relative to the longitudinal axis 132 from the first position to the second position as viewed from outside of the expandable framework 110 looking in toward the central longitudinal axis 102. In some embodiments, the first strut 140 may move circumferentially in a first direction around and/or relative to the central longitudinal axis 102 (e.g., FIG. 3) from the first position to the second position. In some embodiments, the second strut 142 may be disposed in a second position in the second configuration. In some embodiments, the second strut 142 may move laterally in a second direction relative to the longitudinal axis 132 from the first position to the second position as viewed from outside of the expandable framework 110 looking in toward the central longitudinal axis 102. In some embodiments, the second strut 142 may move circumferentially in a second direction around and/or relative to the central longitudinal axis 102 (e.g., FIG. 3) from the first position to the second position. In at least some embodiments, the second direction may be opposite the first direction relative to the longitudinal axis 132 as viewed from outside of the expandable framework 110 looking in toward the central longitudinal axis 102. In some embodiments, the second direction may be circumferentially opposite the first direction around and/or relative to the central longitudinal axis 102.

In some embodiments, the third strut 144 may be configured to shift radially relative to the longitudinal axis 132 from the first position in the first configuration to a second position in the second configuration as viewed from outside of the expandable framework 110 looking in toward the central longitudinal axis 102. In some embodiments, the third strut 144 may be configured to shift radially relative to the central longitudinal axis 102 from the first position in the first configuration to a second position in the second configuration. In some embodiments, the second position of the third strut 144 may be disposed radially outward from the first position and/or the longitudinal axis 132, as seen in FIG. 5, and as viewed from outside of the expandable framework 110 looking in toward the central longitudinal axis 102. Other configurations are also possible, some of which are discussed herein with respect to FIGS. 8-13.

Figure 7:
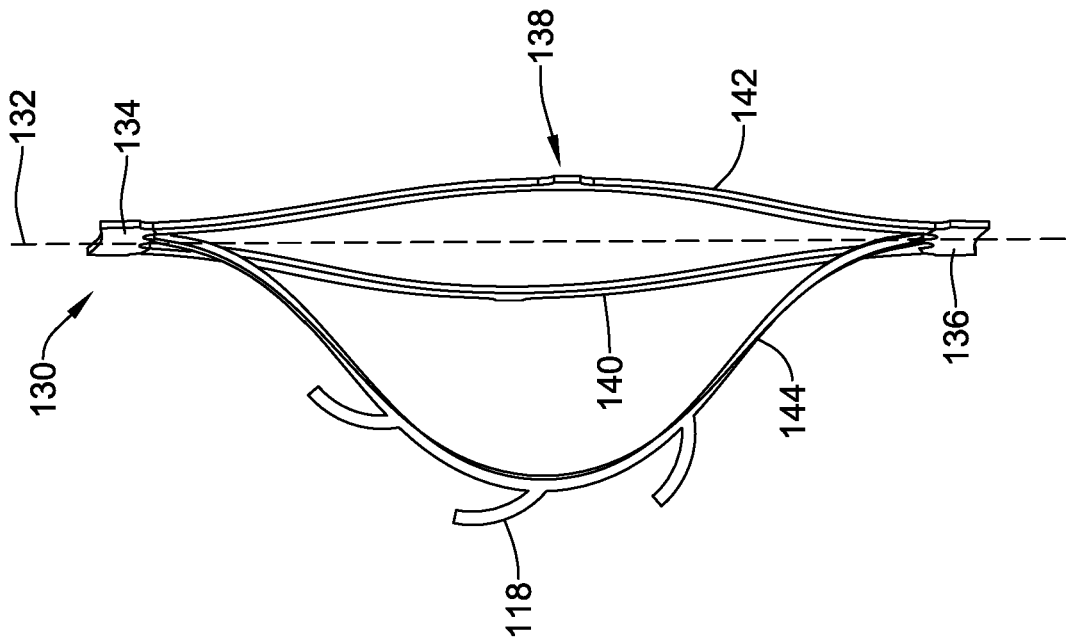
FIGS. 6-7 illustrate alternative configurations of a plurality of anchor members of the expandable framework.
Figure 6:
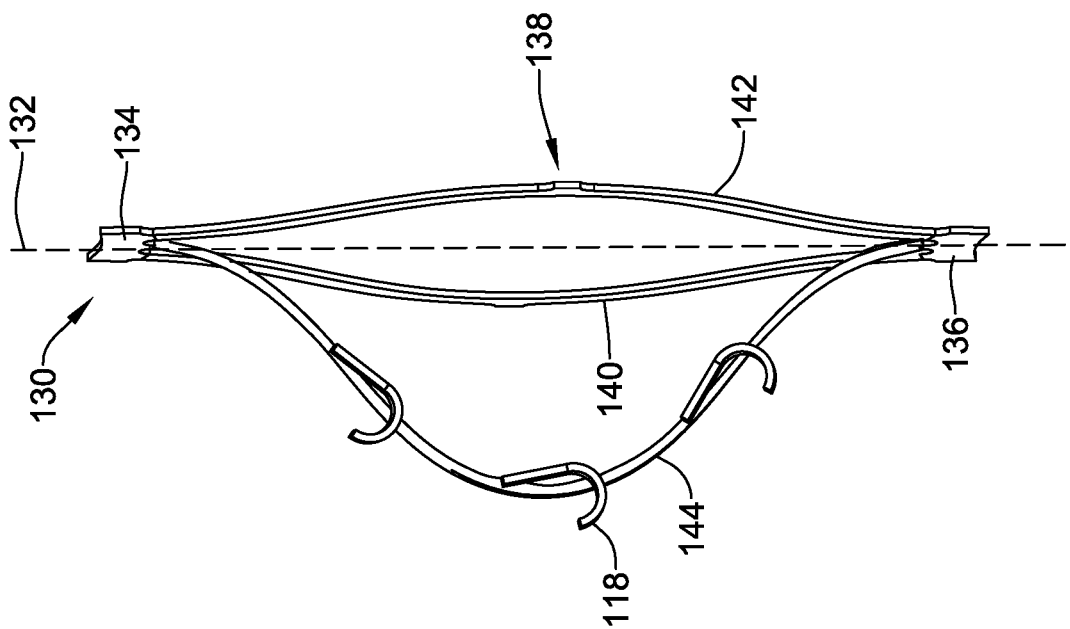

In some embodiments, the expandable framework 110 and/or the third strut 144 may include at least one anchor member 118 each having a free end extending radially outward from the expandable framework 110 and/or the third strut 144 in the second configuration and being connected to the expandable framework 110 and/or the third strut 144 at a base. The at least one anchor member 118 is configured to engage a wall of a left atrial appendage in the second configuration. In some embodiments, one or more of the at least one anchor member 118 extends through the occlusive element 120, as shown in FIG. 2. In some embodiments, the third strut 144 of some strut groups of the plurality of strut groups 130 may include at least one anchor member 118, as seen in FIG. 3. In some embodiments, the third strut 144 of each strut group of the plurality of strut groups 130 may include at least one anchor member 118. In some embodiments, the at least one anchor member 118 may include a plurality of anchor members (e.g., two anchor members, three anchor members, etc.), as seen in FIGS. 6-7. In one non-limiting example, FIG. 6 shows the at least one anchor member 118 fixedly attached to the third strut 144 and shaped in a J-hook configuration in the second configuration. In another non-limiting example, FIG. 7 shows the at least one anchor member 118 fixedly attached to the third strut 144 and extending proximally from the third strut 144 at an oblique angle to the third strut 144 in the second configuration. In some embodiments, the at least one anchor member 118 may be formed separately from the expandable framework 110 and subsequently fixedly attached thereto. In some embodiments, the at least one anchor member 118 may be integrally formed with the expandable framework 110 and/or the third strut 144 as a single monolithic structure. Alternatively, in some embodiments, the expandable framework 110 and/or the third strut 144 may be devoid of any anchor members extending and/or projecting radially outward in the second configuration.

In some embodiments, the second position of the third strut 144 may be disposed radially inward from the first position and/or the longitudinal axis 132, as shown in FIGS. 8, 10, and 12. In some embodiments, in the second configuration, the third strut 144 may be configured to selectively shift radially outward from the second position (e.g., FIGS. 8, 10, and 12) to a third position radially outward of the first position and/or the longitudinal axis 132, as shown in FIGS. 9, 11, and 13. In some embodiments, the third strut 144 may be bistable such that the third strut 144 may be stable and/or may be self-biased to be in the second position and/or the third position. In the first position and/or the first configuration, tension on the third strut 144 may keep and/or maintain the third strut 144 in the first position. As the expandable framework 110 shifts from the first configuration toward the second configuration, compressive force may be exerted on the third strut 144, thereby destabilizing the third strut 144 and causing it to shift away from the first position and/or the longitudinal axis 132 toward the second position. As discussed herein, in some embodiments, the second position of the third strut 144 may be radially outward of the first position and/or the longitudinal axis 132, and in some embodiments, the second position of the third strut 144 may be radially inward of the first position and/or the longitudinal axis 132. In the examples shown in FIGS. 8-13, the second position of the third strut 144 is radially inward of the first position and/or the longitudinal axis 132, and the third position of the third strut 144 is radially outward of the first position and/or the longitudinal axis 132. In some embodiments, an external force may be required to shift the third strut 144 from the second position to the third position, or vice versa.

In the examples shown in FIGS. 8-13, the at least one anchor member 118 may be disposed within an interior of the expandable framework 110 and/or may be spaced away from tissue at a treatment site (e.g., a wall of the left atrial appendage) when the third strut 144 is in the second position. This may be beneficial when placing the medical implant 100 because the medical implant 100 may be repositioned, if necessary, while minimizing injury and/or damage to the tissue (e.g., the wall of the left atrial appendage) prior to anchoring and release from the core wire 30. Once the practitioner is satisfied with placement with the medical implant 100, which may be verified using a suitable imaging means, the third strut 144 may be selectively shifted to the third position, wherein the at least one anchor member 118 extends radially outward from the expandable framework 110 and/or engages with the tissue (e.g., the wall of the left atrial appendage) to anchor the medical implant 100 in place and the core wire may then be disconnected from the medical implant 100.

In some embodiments, the third strut 144 and/or the plurality of strut groups 130 may be formed from a shape memory material that responds to an external stimulus, such as temperature or an electrical current/voltage for example. Other configurations are also contemplated. In FIGS. 8-9, the third strut 144 may be seen shifting from the second position (e.g., FIG. 8) to the third position (e.g., FIG. 9) in response to the external stimulus. In at least some embodiments, no external structure and/or no additional structure is required to shift the third strut 144 from the second position to the third position.

In some embodiments, the third strut 144 may be selectively shifted from the second position to the third position using an actuation element 150. In some embodiments, the actuation element 150 may be an expandable member 152 disposed within the expandable framework 110, as seen in FIGS. 10-11. In some embodiments, the medical implant 100 may include an elongate shaft 154 coupled to the expandable member 152. The elongate shaft 154 may extend within, through, and/or alongside the core wire 30. The elongate shaft 154 may extend through the proximal hub 111 to the expandable member 152. In some embodiments, the expandable member 152 may be mechanically expandable. In some embodiments, the expandable member 152 may be inflatable using a fluid or gas. In at least some embodiments, the expandable member 152 may be an inflatable balloon and the elongate shaft 154 may include an inflation lumen 156 extending therein in fluid communication with the inflatable balloon.

As discussed above, shifting the expandable framework 110 from the first configuration to the second configuration may cause the third strut 144 to shift from the first position to the second position, as shown in FIG. 10. Once placement is confirmed, the expandable member 152 may be expanded from a delivery configuration (e.g., FIG. 10) to an expanded configuration (e.g., FIG. 11), thereby exerting a force against the third strut 144 to selectively shift the third strut 144 from the second position to the third position, as shown in FIG. 11. After anchoring the medical implant and/or after shifting the third strut 144 from the second position to the third position, the expandable member 152 may be collapsed back to the delivery configuration and/or removed from the medical implant 100, if appropriate.

In some embodiments, the actuation element 150 may be at least one tether 160 disposed and/or extending within the expandable framework 110, as seen in FIGS. 12-13. The at least one tether 160 may extend within, through, and/or alongside the core wire 30. The at least one tether 160 may extend through the proximal hub 111 to the distal hub 117 and from the distal hub 117 to the third strut 144. In some embodiments, the distal hub 117 may include an aperture (e.g., a hole or an eyelet) that the at least one tether 160 passes through. In some embodiments, the distal hub 117 may include a pin or a shaft that the at least one tether 160 passes around. Other configurations are also contemplated.

In some embodiments, each strut group of the plurality of strut groups 130 may have one tether of the at least one tether 160 associated therewith. For example, and without limitation, a medical implant 100 having eight strut groups may have at least one tether 160 associated therewith. The quantity eight is chosen merely as an example, and other quantities are also contemplated. In some embodiments, the medical implant 100 having eight strut groups may include eight individual tethers—one coupled to the third strut 144 of each strut group of the plurality of strut groups 130. In some embodiments, the medical implant 100 having eight strut groups (and/or the at least one tether 160 associated therewith) may include one core tether extending to the distal hub 117 and eight distal tethers, wherein one distal tether extends from the one core tether to the third strut 144 of each strut group of the plurality of strut groups 130. Other configurations are also contemplated.

In some embodiments, the third strut 144 may be self-biased toward the third position, and the third strut 144 may be held or retained in the second position by tension applied to the at least one tether 160 during deployment of the medical implant 100 and/or as the expandable framework 110 is shifted from the first configuration to the second configuration. In some embodiments, the third strut 144 may be self-biased toward the third position, and the third strut 144 may be pulled radially inward by the at least one tether 160 toward and/or to the second position as the expandable framework 110 is shifted from the first configuration to the second configuration. As discussed above, shifting the expandable framework 110 from the first configuration to the second configuration may cause the third strut 144 to shift from the first position to the second position, as shown in FIG. 12. Tension on the at least one tether 160 may hold and/or retain the third strut 144 in the second position as the expandable framework 110 is shifted to the second configuration.

Once placement is confirmed, the at least one tether 160 may be released in the second configuration, thereby allowing the third strut 144 to selectively shift from the second position to the third position, as shown in FIG. 13. The at least one tether 160 may be subsequently removed from the medical implant 100 and/or the patient. In some embodiments, releasing the at least one tether 160 may include cutting the at least one tether 160, easing or releasing tension on the at least one tether 160, releasing one end of the at least one tether 160 as the at least one tether 160 is looped through or around the third strut 144 such that the at least one tether 160 may be pulled through the medical implant 100, etc. Other configurations are also contemplated.

Figure 14:
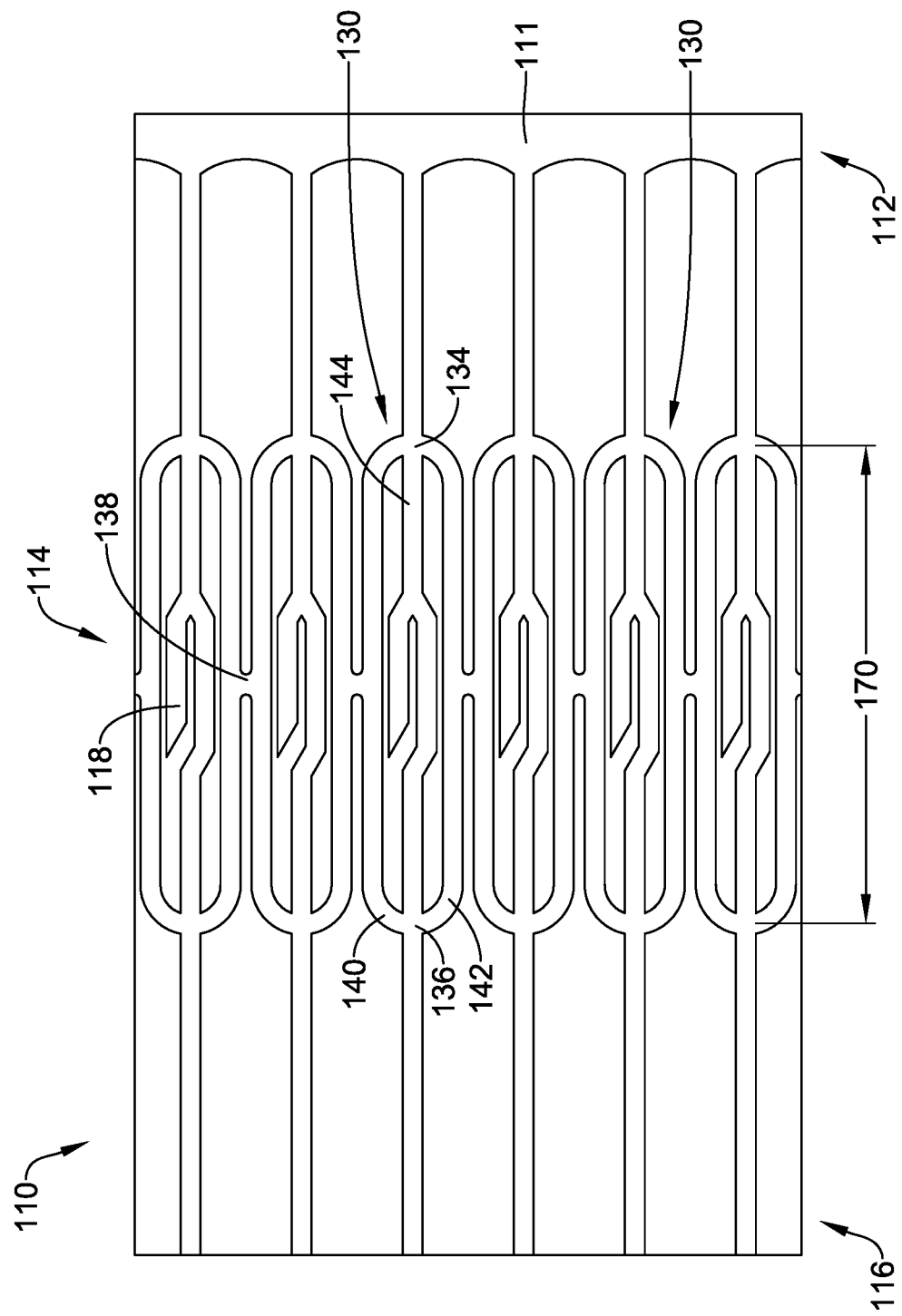
FIG. 14 is a flat pattern view illustrating selected aspects of an exemplary embodiment of the expandable framework in the first configuration.

FIG. 14 is a flat pattern view illustrating selected aspects of one example of the expandable framework 110. It shall be understood that FIG. 14 is merely exemplary with respect to some features, and other configurations, including those shown in FIGS. 3-4 are also contemplated, either alone or in combination. In at least some embodiments, in the first configuration, the first strut 140, the second strut 142, and/or the third strut 144 of each strut group of the plurality of strut groups 130 may be of equal length 170, as seen in FIG. 14 and also in FIG. 4. This arrangement and/or configuration may ease and/or improve manufacturability of the plurality of strut groups 130 and/or the expandable framework 110.

In some embodiments, the expandable framework 110 may be formed and/or cut from a unitary tubular member in the first configuration. Alternatively, the expandable framework 110 may be formed and/or cut from a flat sheet of material that is later rolled and/or formed into a tubular member. After forming the flat sheet of material into a tubular member, the tubular member may be welded or otherwise fixedly secured into a tubular shape. In some embodiments, forming and/or cutting the expandable framework 110 may be done via laser, waterjet, machining, etc. Other manufacturing methods and/or processes are also contemplated. It shall be understood that in some embodiments, forming and/or cutting the expandable framework 110 from a unitary tubular member may be preferred and illustration of a flat pattern does not constitute a preference for forming and/or cutting the expandable framework 110 from a flat sheet of material.

In some embodiments, the plurality of strut groups 130 may be integrally formed with a remainder of the expandable framework 110 as a single monolithic structure to form the expandable framework 110 as a whole. In some alternative embodiments, the plurality of strut groups 130 may be formed separately and subsequently fixedly attached the remainder of the expandable framework 110 to form the expandable framework 110 as a whole. In some embodiments, the plurality of strut groups 130 may be fixedly attached to the remainder of the expandable framework 110 by welding, brazing, adhesive bonding, etc. Other configurations are also contemplated. In some embodiments, after forming and/or heat setting the medical implant 100 and/or the expandable framework 110 into the second configuration, the occlusive element 120 may be secured to the expandable framework 110. In some embodiments, at least some of the at least one anchor member 118 may extend through the occlusive element 120 in the second configuration.

Figure 15:
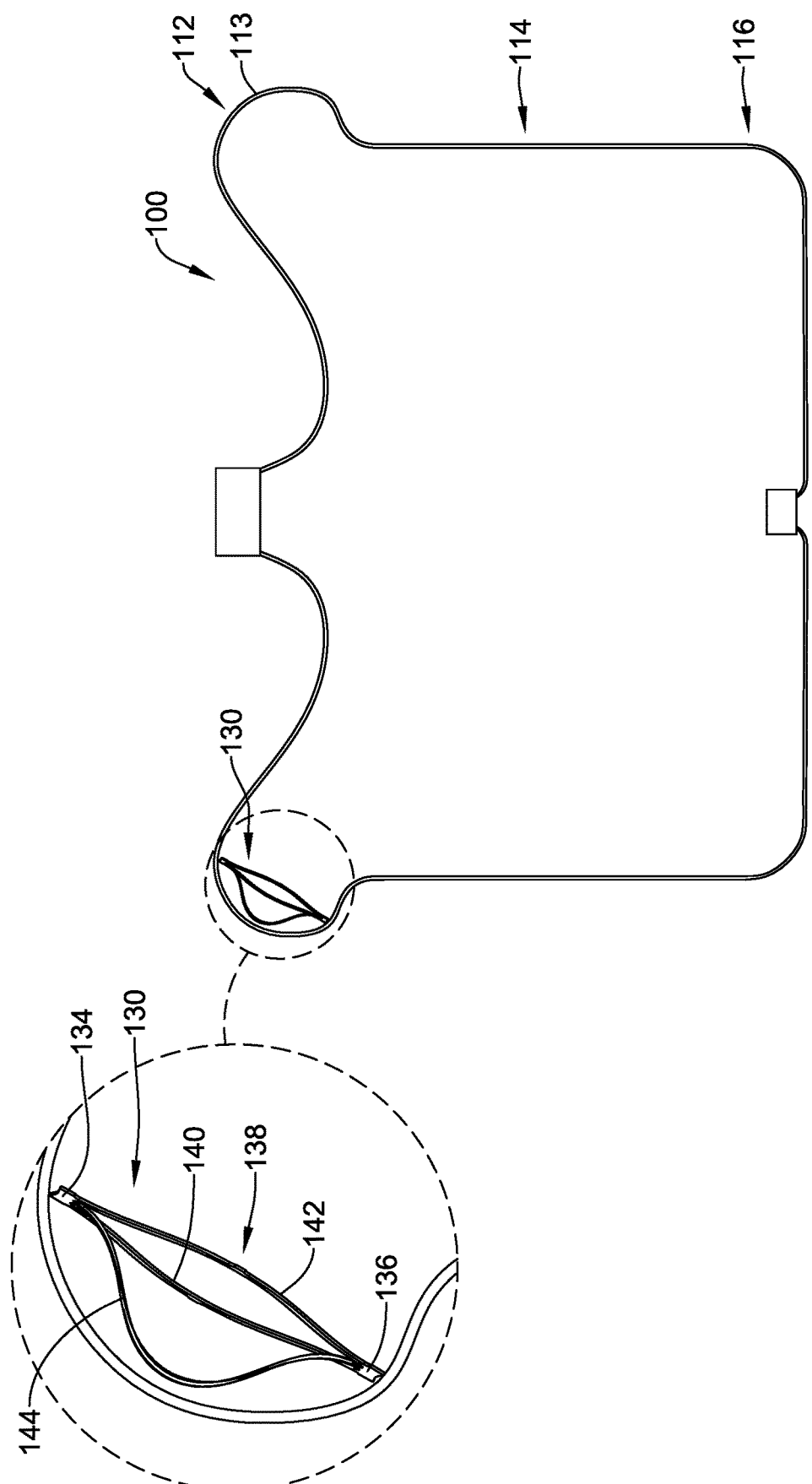
FIG. 15 illustrates selected aspects of one embodiment of the expandable framework in the second configuration.

FIG. 15 illustrates an alternative configuration for the expandable framework 110, wherein the plurality of strut groups 130 defines the shoulder region 112 of the expandable framework 110 in the second configuration. In some embodiments, the shoulder region 112 of the expandable framework 110 may define the outermost radial extent of the expandable framework 110 and/or and proximate the proximal end of the medical implant 100 and/or the expandable framework 110 in the second configuration. By positioning and/or applying the plurality of strut groups 130 at the shoulder region 112 of the expandable framework 110 in the second configuration, the medical implant 100 and/or the expandable framework 110 may create a lip 113 extending radially outward of the body region 114. The lip 113 may be positioned proximate and/or within the ostium of the left atrial appendage. In some embodiments, the lip 113 may improve sealing around the perimeter of the medical implant 100 and/or the expandable framework 110 by further engaging and/or applying outward radial force to the wall and/or the ostium of the left atrial appendage. In some embodiments, the third strut 144 of each strut group of the plurality of strut groups 130 may provide some compliance for engagement with the wall and/or the ostium of the left atrial appendage, and/or may improve sealing pressure between the medical implant 100 and the wall and/or the ostium of the left atrial appendage. In some embodiments, the first strut 140 and the second strut 142 of each strut group of the plurality of strut groups 130 may provide and/or maintain higher stiffness at and/or adjacent to the body region 114 of the expandable framework 110 to prevent collapse of the expandable framework 110 and/or to maintain radially outward force against the wall and/or the ostium of the left atrial appendage. Other configurations are also contemplated. For example, in some alternative configurations, the plurality of strut groups 130 may be disposed at and/or along a middle region of the expandable framework 110 and/or a distal region of the expandable framework 110 such that a lip and/or radial protrusion is created around a perimeter of the middle region of the expandable framework 110 and/or the distal region of the expandable framework 110, respectively, in the second configuration to improve sealing between the medical implant 100 and the wall of the left atrial appendage.

Figure 17:
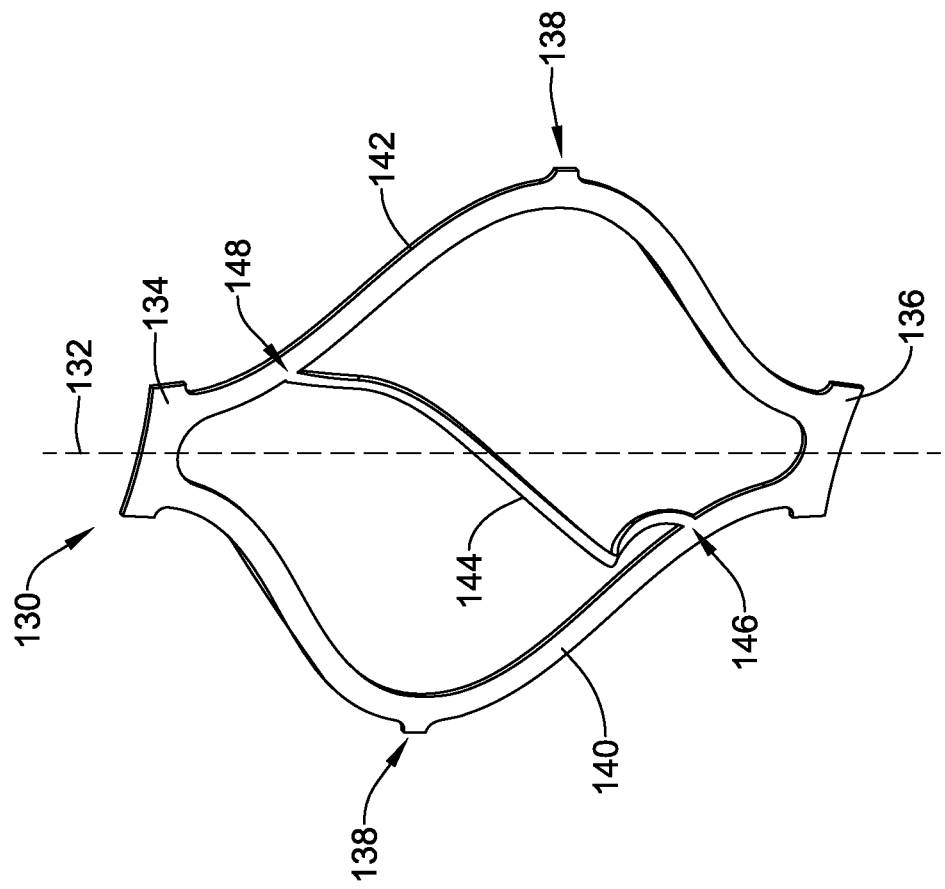
FIG. 17 illustrates selected aspects of the alternative configuration of one of the plurality of strut groups of the expandable framework of FIG. 16 in a second configuration.
Figure 16:
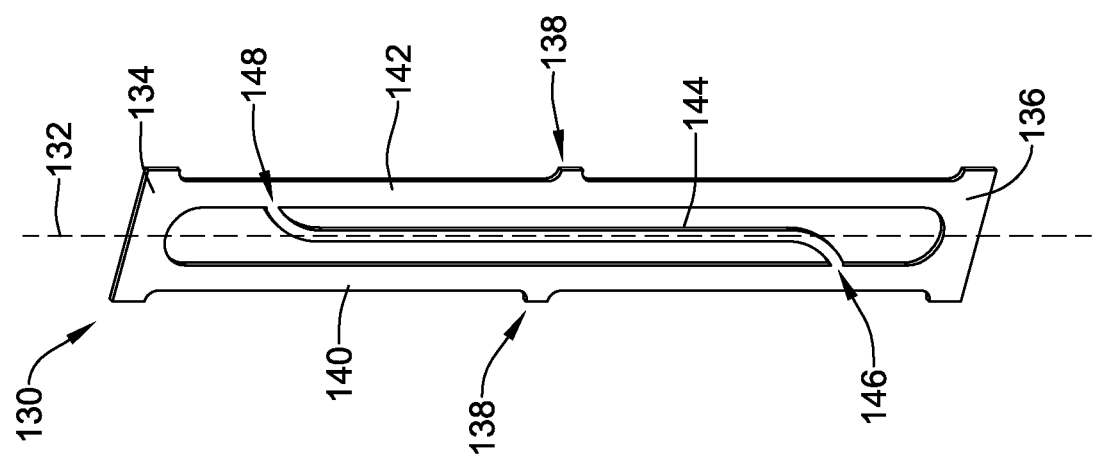
FIG. 16 illustrates selected aspects of an alternative configuration of one of a plurality of strut groups of the expandable framework in a first configuration.

FIGS. 16-17 illustrate an alternative configuration of a portion of the expandable framework 110 and/or one strut group of the plurality of strut groups 130. Similar to other embodiments discussed herein, in some embodiments, each strut group of the plurality of strut groups 130 may include a longitudinal axis 132 extending from a first joint 134 to a second joint 136. In some embodiments, each strut group of the plurality of strut groups 130 may include a first strut 140 extending from the first joint 134 to the second joint 136, a second strut 142 extending from the first joint 134 to the second joint 136, and a third strut 144 disposed circumferentially (relative to the central longitudinal axis 102) between the first strut 140 and the second strut 142.

In some embodiments, the third strut 144 may extend from the first strut 140 to the second strut 142. In some embodiments, the third strut 144 may include a first end 146 fixedly attached to and/or integrally formed with the first strut 140 at a first location disposed between the second joint 136 and a midpoint of the first strut 140. In some embodiments, the third strut 144 may include a second end 148 fixedly attached to and/or integrally formed with the second strut 142 at a second location disposed between the first joint 134 and a midpoint of the second strut 142. In will be appreciated that in some embodiments, the first location and the second location may be reversed such that the first location is disposed between the first joint 134 and the midpoint of the second strut 142 and the second location is disposed between the second joint 136 and the midpoint of the first strut 140. In some embodiments, orientation of the third strut 144 may alternate between adjacent strut groups of the plurality of strut groups 130.

In some embodiments, the first strut 140, the second strut 142, and/or a majority of a length of the third strut 144 of each strut group of the plurality of strut groups 130 may be oriented parallel to each other in the first configuration (e.g., FIG. 1, FIG. 16) and nonparallel to each other in the second configuration (e.g., FIG. 2, FIG. 17). In some embodiments, the first strut 140, the second strut 142, and/or the third strut 144 may be generally coplanar in the first configuration. In some embodiments, the first strut 140, the second strut 142, and/or the third strut 144 may be disposed along a curve or an arc around the central longitudinal axis 102 in the first configuration. In some alternative configurations, the third strut 144 may be oriented nonparallel to the first strut 140 and/or the second strut 142 in the first configuration and in the second configuration. For example, the third strut 144 may be oriented at an oblique angle to the first strut 140 and/or the second strut 142 in the first configuration. Other configurations are also contemplated.

Each strut group of the plurality of strut groups 130 may be fixedly attached to another strut group of the plurality of strut groups 130 at one of a plurality of body joints 138. In some embodiments, the plurality of body joints 138 may be disposed at and/or adjacent to the midpoint(s) of the first strut 140 and/or the second strut 142. Some additional details regarding the plurality of strut groups 130 and individual struts thereof are discussed below.

The first strut 140 may be disposed in a first position (e.g., FIG. 1, FIG. 16) in the first configuration. The second strut 142 may be disposed in a first position (e.g., FIG. 1, FIG. 16) in the first configuration. The third strut 144 may be disposed in a first position (e.g., FIG. 1, FIG. 16) in the first configuration. In some embodiments, the majority of the third strut 144 may be at least partially coaxial and/or coincident with the longitudinal axis 132 in the first position and/or the first configuration. As may be seen in FIG. 16, the third strut 144 may be disposed between and/or may extend between the first strut 140 and the second strut 142. In some embodiments, the third strut 144 may be disposed circumferentially between the first strut 140 and the second strut 142 with respect to the central longitudinal axis 102. In some embodiments, the first strut 140 and the second strut 142 within the one strut group of the plurality of strut groups 130 may be disposed on opposite sides of the longitudinal axis 132 from each other.

In some embodiments, the first strut 140 may be disposed in a second position in the second configuration. In some embodiments, the first strut 140 may move laterally in a first direction relative to the longitudinal axis 132 from the first position to the second position as viewed from outside of the expandable framework 110 looking in toward the central longitudinal axis 102. In some embodiments, the first strut 140 may move circumferentially in a first direction around and/or relative to the central longitudinal axis 102 from the first position to the second position. In some embodiments, the second strut 142 may be disposed in a second position in the second configuration. In some embodiments, the second strut 142 may move laterally in a second direction relative to the longitudinal axis 132 from the first position to the second position as viewed from outside of the expandable framework 110 looking in toward the central longitudinal axis 102. In some embodiments, the second strut 142 may move circumferentially in a second direction around and/or relative to the central longitudinal axis 102 from the first position to the second position. In at least some embodiments, the second direction may be opposite the first direction relative to the longitudinal axis 132 as viewed from outside of the expandable framework 110 looking in toward the central longitudinal axis 102. In some embodiments, the second direction may be circumferentially opposite the first direction around and/or relative to the central longitudinal axis 102.

In some embodiments, the third strut 144 may be configured to shift radially relative to the longitudinal axis 132 from the first position in the first configuration to a second position in the second configuration as viewed from outside of the expandable framework 110 looking in toward the central longitudinal axis 102. In some embodiments, the third strut 144 may be configured to shift radially relative to the central longitudinal axis 102 from the first position in the first configuration to a second position in the second configuration. In some embodiments, the second position of the third strut 144 may be disposed radially outward from the first position and/or the longitudinal axis 132, as seen in FIG. 17, and as viewed from outside of the expandable framework 110 looking in toward the central longitudinal axis 102. Other configurations are also contemplated.

As discussed above, the first end 146 of the third strut 144 may be fixedly attached to and/or integrally formed with the first strut 140 at the first location and the second end 148 of the third strut 144 may be fixedly attached to and/or integrally formed with the second strut 142 at the second location. As the first location is moved closer to or farther from the second joint 136 and/or as the second location is moved closer to or farther from the first joint 134, an orientation of the third strut 144 relative to the longitudinal axis 132, the first strut 140, and/or second strut 142 in the first position and particularly in the second position may change. As the first location is moved closer to the second joint 136 and/or as the second location is moved closer to the first joint 134, the orientation of the third strut 144 may be more vertical relative to the longitudinal axis 132 and/or closer to the orientation illustrated in FIG. 5. As the first location is moved farther from the second joint 136 and/or as the second location is moved farther from the first joint 134, the orientation of the third strut 144 may be more tilted, angled, and/or horizontal relative to the longitudinal axis 132. When the orientation of the third strut 144 becomes more tilted, angled, and/or horizontal relative to the longitudinal axis 132, the third strut 144 and/or the plurality of strut groups 130 may provide improved and/or increased sealing capability when engaged with the wall of the left atrial appendage.

Similar to other embodiments discussed herein, in some embodiments, the expandable framework 110 and/or the third strut 144 may include at least one anchor member each having a free end extending radially outward from the expandable framework 110 and/or the third strut 144 in the second configuration and being connected to the expandable framework 110 and/or the third strut 144 at a base. In some embodiments, the at least one anchor member may be aligned with and/or parallel to the third strut 144. In some embodiments, the at least one anchor member may be twisted and/or bent at the base and/or along its length such that the free end is generally parallel to the longitudinal axis 132 and/or the central longitudinal axis 102. Other configurations, including combinations thereof, are also contemplated. The at least one anchor member is configured to engage a wall of a left atrial appendage in the second configuration. Alternatively, in some embodiments, the expandable framework 110 and/or the third strut 144 may be devoid of any anchor members extending and/or projecting radially outward in the second configuration.

The materials that can be used for the various components of the medical implants and/or medical device systems disclosed herein may include those commonly associated with medical devices. For simplicity purposes, the following discussion refers to the system. However, this is not intended to limit the system, devices, and/or methods described herein, as the discussion may be applied to other elements, members, components, or devices disclosed herein, such as, but not limited to, the expandable framework, the plurality of strut groups, the at least one anchor member, the occlusive element, etc. and/or elements or components thereof.

In some embodiments, the system and/or components thereof may be made from a metal, metal alloy, polymer (some examples of which are disclosed below), a metal-polymer composite, ceramics, combinations thereof, and the like, or other suitable material.

Some examples of suitable polymers may include polytetrafluoroethylene (PTFE), ethylene tetrafluoroethylene (ETFE), fluorinated ethylene propylene (FEP), polyoxymethylene (POM, for example, DELRIN®), polyether block ester, polyurethane (for example, Polyurethane 85A), polypropylene (PP), polyvinylchloride (PVC), polyether-ester (for example, ARNITEL®), ether or ester based copolymers (for example, butylene/poly(alkylene ether) phthalate and/or other polyester elastomers such as HYTREL®), polyamide (for example, DURETHAN® or CRISTAMID®), elastomeric polyamides, block polyamide/ethers, polyether block amide (PEBA, for example available under the trade name PEBAX®), ethylene vinyl acetate copolymers (EVA), silicones, polyethylene (PE), MARLEX® high-density polyethylene, MARLEX® low-density polyethylene, linear low density polyethylene (for example REXELL®), polyester, polybutylene terephthalate (PBT), polyethylene terephthalate (PET), polytrimethylene terephthalate, polyethylene naphthalate (PEN), polyetheretherketone (PEEK), polyimide (PI), polyetherimide (PEI), polyphenylene sulfide (PPS), polyphenylene oxide (PPO), poly paraphenylene terephthalamide (for example, KEVLAR®), polysulfone, nylon, nylon-12 (such as GRILAMID®), perfluoro(propyl vinyl ether) (PFA), ethylene vinyl alcohol, polyolefin, polystyrene, epoxy, polyvinylidene chloride (PVdC), poly(styrene-b-isobutylene-b-styrene) (for example, SIBS and/or SIBS 50A), polycarbonates, polyurethane silicone copolymers (for example, Elast-Eon® or ChronoSil®), biocompatible polymers, other suitable materials, or mixtures, combinations, copolymers thereof, polymer/metal composites, and the like. In some embodiments, the system and/or components thereof can be blended with a liquid crystal polymer (LCP). For example, the mixture can contain up to about 6 percent LCP.

Some examples of suitable metals and metal alloys include stainless steel, such as 304V, 304L, and 316LV stainless steel; mild steel; nickel-titanium alloy such as linear-elastic and/or super-elastic nitinol; other nickel alloys such as nickel-chromium-molybdenum alloys (e.g., UNS: N06625 such as INCONEL® 625, UNS: N06022 such as HASTELLOY® C-22®, UNS: N10276 such as HASTELLOY® C276®, other HASTELLOY® alloys, and the like), nickel-copper alloys (e.g., UNS: N04400 such as MONEL® 400, NICKELVAC® 400, NICORROS® 400, and the like), nickel-cobalt-chromium-molybdenum alloys (e.g., UNS: R30035 such as MP35-N® and the like), nickel-molybdenum alloys (e.g., UNS: N10665 such as HASTELLOY® ALLOY B2®), other nickel-chromium alloys, other nickel-molybdenum alloys, other nickel-cobalt alloys, other nickel-iron alloys, other nickel-copper alloys, other nickel-tungsten or tungsten alloys, and the like; cobalt-chromium alloys; cobalt-chromium-molybdenum alloys (e.g., UNS: R30003 such as ELGILOY®, PHYNOX®, and the like); platinum enriched stainless steel; titanium; platinum; palladium; gold; combinations thereof; or any other suitable material.

In some embodiments, portions or all of the system and/or components thereof may be doped with, made of, or otherwise include a radiopaque material. Radiopaque materials are understood to be materials capable of producing a relatively bright image on a fluoroscopy screen or another imaging technique (e.g., ultrasound, etc.) during a medical procedure. This relatively bright image aids a user in determining the location of the system. Some examples of radiopaque materials can include, but are not limited to, gold, platinum, palladium, tantalum, tungsten alloy, polymer material loaded with a radiopaque filler, and the like. Additionally, other radiopaque marker bands and/or coils may also be incorporated into the design of the system to achieve the same result.

In some embodiments, a degree of Magnetic Resonance Imaging (MRI) compatibility is imparted into the system. For example, the system and/or components or portions thereof may be made of a material that does not substantially distort the image and create substantial artifacts (e.g., gaps in the image). Certain ferromagnetic materials, for example, may not be suitable because they may create artifacts in an MRI image. The system or portions thereof may also be made from a material that the MRI machine can image. Some materials that exhibit these characteristics include, for example, tungsten, cobalt-chromium-molybdenum alloys (e.g., UNS: R44003 such as ELGILOY®, PHYNOX®, and the like), nickel-cobalt-chromium-molybdenum alloys (e.g., UNS: R44035 such as MP35-N® and the like), nitinol, and the like, and others.

In some embodiments, the system may include a textile material. Some examples of suitable textile materials may include synthetic yarns that may be flat, shaped, twisted, textured, pre-shrunk or un-shrunk. Synthetic biocompatible yarns suitable for use in the present invention include, but are not limited to, polyesters, including polyethylene terephthalate (PET) polyesters, polypropylenes, polyethylenes, polyurethanes, polyolefins, polyvinyls, polymethylacetates, polyamides, naphthalene dicarboxylene derivatives, natural silk, and polytetrafluoroethylenes. Moreover, at least one of the synthetic yarns may be a metallic yarn or a glass or ceramic yarn or fiber. Useful metallic yarns include those yarns made from or containing stainless steel, platinum, gold, titanium, tantalum or a Ni—Co—Cr-based alloy. The yarns may further include carbon, glass or ceramic fibers. In some embodiments, the yarns may be made from thermoplastic materials including, but not limited to, polyesters, polypropylenes, polyethylenes, polyurethanes, polynaphthalenes, polytetrafluoroethylenes, and the like. The yarns may be of the multifilament, monofilament, or spun types. The type and denier of the yarn chosen may be selected in a manner which forms a biocompatible system.

In some embodiments, the system and/or other elements disclosed herein may include and/or be treated with a suitable therapeutic agent. Some examples of suitable therapeutic agents may include anti-thrombogenic agents (such as heparin, heparin derivatives, urokinase, and PPack (dextrophenylalanine proline arginine chloromethyl ketone)); anti-protein and/or anti-bacterial agents (such as 2-methacryroyloxyethyl phosphorylcholine (MPC) and its polymers or copolymers); anti-proliferative agents (such as enoxaparin, angiopeptin, monoclonal antibodies capable of blocking smooth muscle cell proliferation, hirudin, and acetylsalicylic acid); anti-inflammatory agents (such as dexamethasone, prednisolone, corticosterone, budesonide, estrogen, sulfasalazine, and mesalamine); antineoplastic/antiproliferative/anti-mitotic agents (such as paclitaxel, 5-fluorouracil, cisplatin, vinblastine, vincristine, epothilones, endostatin, angiostatin and thymidine kinase inhibitors); anesthetic agents (such as lidocaine, bupivacaine, and ropivacaine); anti-coagulants (such as D-Phe-Pro-Arg chloromethyl ketone, an RGD peptide-containing compound, heparin, anti-thrombin compounds, platelet receptor antagonists, anti-thrombin antibodies, anti-platelet receptor antibodies, aspirin, prostaglandin inhibitors, platelet inhibitors, and tick anti-platelet peptides); vascular cell growth promoters (such as growth factor inhibitors, growth factor receptor antagonists, transcriptional activators, and translational promoters); vascular cell growth inhibitors (such as growth factor inhibitors, growth factor receptor antagonists, transcriptional repressors, translational repressors, replication inhibitors, inhibitory antibodies, antibodies directed against growth factors, bifunctional molecules consisting of a growth factor and a cytotoxin, bifunctional molecules consisting of an antibody and a cytotoxin); cholesterol-lowering agents; vasodilating agents; and agents which interfere with endogenous vasoactive mechanisms.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments. The disclosure's scope is, of course, defined in the language in which the appended claims are expressed.

What is claimed is:

1. A medical implant for occluding a left atrial appendage, comprising:
   an expandable framework configured to shift radially relative to a central longitudinal axis between a first configuration and a second configuration; and
   an occlusive element secured to the expandable framework;
   wherein the expandable framework includes a plurality of strut groups, each strut group comprising a longitudinal axis extending from a first joint to a second joint, a first strut extending from the first joint to the second joint, a second strut extending from the first joint to the second joint, and a third strut disposed between the first strut and the second strut;
   wherein the first strut is disposed in a first strut first position in the first configuration and a first strut second position in the second configuration, the first strut moving laterally in a first direction relative to the longitudinal axis from the first strut first position to the first strut second position;
   wherein the second strut is disposed in a second strut first position in the first configuration and a second strut second position in the second configuration, the second strut moving laterally in a second direction relative to the longitudinal axis from the second strut first position to the second strut second position;
   wherein the third strut is disposed in a third strut first position in the first configuration and is configured to shift radially relative to the longitudinal axis from the third strut first position in the first configuration to a third strut second position in the second configuration;
   wherein the third strut second position is disposed radially inward from the longitudinal axis; and
   wherein in the second configuration, the third strut is configured to selectively shift radially inward from the third strut second position to a third strut third position radially outward of the third strut first position.

2. The medical implant of claim 1, wherein the third strut is selectively shifted from the third strut second position to the third strut third position using an actuation element.

3. The medical implant of claim 2, wherein the actuation element is an expandable member disposed within the expandable framework.

4. The medical implant of claim 2, wherein the actuation element is at least one tether disposed within the expandable framework.

5. The medical implant of claim 4, wherein the third strut is pulled radially inward by the at least one tether as the expandable framework shifts from the first configuration to the second configuration.

6. The medical implant of claim 5, wherein subsequently releasing the at least one tether in the second configuration permits the third strut to shift to the third strut third position.

7. The medical implant of claim 1, wherein the third strut second position is disposed radially outward from the longitudinal axis.

8. The medical implant of claim 1, wherein the third strut of each strut group includes at least one anchor member extending radially outward from the third strut in the second configuration.

9. The medical implant of claim 1, wherein the plurality of strut groups defines a body region of the expandable framework.

10. The medical implant of claim 1, wherein the plurality of strut groups defines a shoulder region of the expandable framework.

11. The medical implant of claim 1, wherein in the first configuration, the first strut, the second strut, and the third strut of each strut group are of equal length.

* * * * *